(12) United States Patent
Moses et al.

(10) Patent No.: US 11,604,399 B2
(45) Date of Patent: Mar. 14, 2023

(54) BACK-CONVERSION SUPPRESSED OPTICAL PARAMETRIC AMPLIFICATION

(71) Applicant: Cornell University, Ithaca, NY (US)

(72) Inventors: Jeffrey Moses, Ithaca, NY (US); Noah Flemens, Ithaca, NY (US); Nicolas Swenson, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 17/754,475

(22) PCT Filed: Oct. 5, 2020

(86) PCT No.: PCT/US2020/054317
§ 371 (c)(1),
(2) Date: Apr. 1, 2022

(87) PCT Pub. No.: WO2021/067969
PCT Pub. Date: Apr. 8, 2021

(65) Prior Publication Data
US 2022/0350221 A1    Nov. 3, 2022

Related U.S. Application Data

(60) Provisional application No. 62/911,149, filed on Oct. 4, 2019.

(51) Int. Cl.
*G02F 1/39* (2006.01)
*G02F 1/35* (2006.01)
(Continued)

(52) U.S. Cl.
CPC ............ *G02F 1/392* (2021.01); *G02F 1/3548* (2021.01); *G02F 1/395* (2013.01); *H01S 3/0092* (2013.01); *H01S 3/1083* (2013.01); *H01S 3/1312* (2013.01)

(58) Field of Classification Search
CPC ........ G02F 1/3548; G02F 1/392; G02F 1/395; H01S 3/0092; H01S 3/1083; H01S 3/1312
See application file for complete search history.

(56) References Cited

U.S. PATENT DOCUMENTS 6,751,010 B1    6/2004   Richter
9,341,920 B1 *  5/2016   Reed ..................... G02F 1/39
(Continued)

FOREIGN PATENT DOCUMENTS

EP        857997 A2 *  8/1998  ............. G02F 1/39
WO    WO-2006064939 A1 *  6/2006  ........... G02F 1/3544
WO    WO-2019222263 A1 * 11/2019 ........... G02F 1/3509

OTHER PUBLICATIONS

Kartaloğlu et al., "Simultaneous phase matching of optical parametric oscillation and second-harmonic generation in aperiodically poled lithium niobate," J. Opt. Soc. Am. B vol. 20, No. 2, Feb. 2003, pp. 343-350 (Year: 2003).*

(Continued)

*Primary Examiner* — Daniel Petkovsek
(74) *Attorney, Agent, or Firm* — Lathrop GPM LLP

(57) ABSTRACT

In one aspect, a device is disclosed that includes one or more input ports structured to receive a pumping light at a pumping wavelength and a signal light at a signal wavelength, and one or more output ports structured to output light including an amplified signal light at the signal wavelength and a second harmonic idler light. The device includes a nonlinear optical material to mix the pumping light and the signal light and to cause nonlinear conversion of the pumping light into the amplified signal light and generate an idler light at an idler wavelength. The nonlinear optical material is further structured to convert the idler light into the second harmonic idler light which eliminates the (Continued)

idler light at the one or more output ports and prevents back-conversion of the amplified signal light and idler light to the pumping wavelength.

17 Claims, 18 Drawing Sheets

(51) Int. Cl.
  *H01S 3/131* (2006.01)
  *H01S 3/108* (2006.01)
  *H01S 3/00* (2006.01)

(56) References Cited

U.S. PATENT DOCUMENTS

| | | | |
|---|---|---|---|
| 10,642,127 B1* | 5/2020 | Simanovski | G02F 1/37 |
| 2002/0176472 A1 | 11/2002 | Arbore et al. | |
| 2015/0036210 A1 | 2/2015 | Asobe et al. | |
| 2016/0026066 A1* | 1/2016 | Stultz | G02F 1/3544 |
| | | | 359/330 |
| 2020/0059060 A1* | 2/2020 | Shaw | H01S 3/1083 |

OTHER PUBLICATIONS

International Search Report and Written Opinion for PCT/US2020/054317, dated Mar. 10, 2021, 11 pages.

* cited by examiner

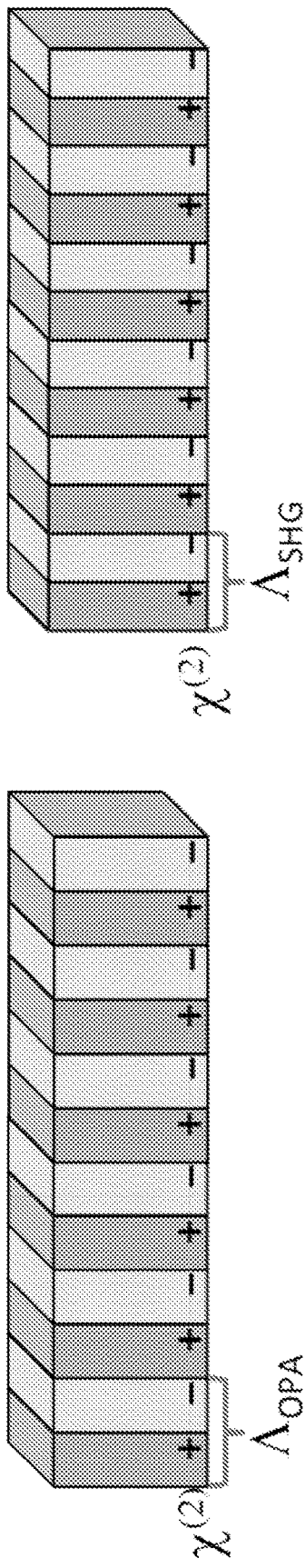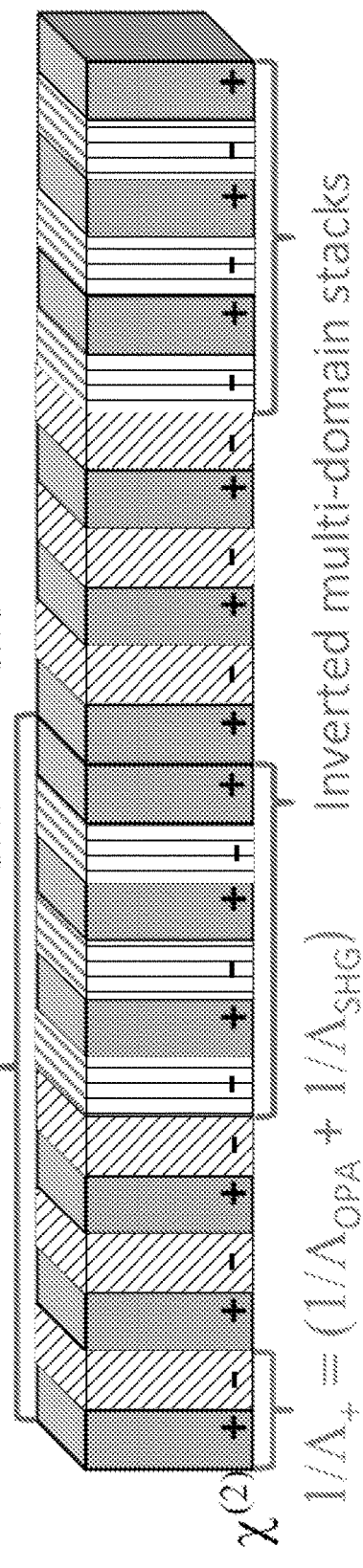
FIG. 2A
FIG. 2B

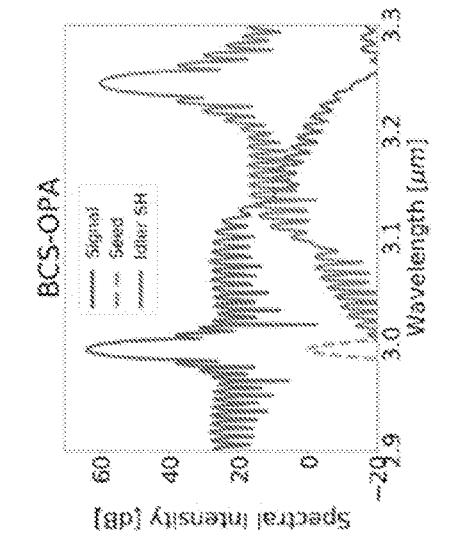
FIG. 7C
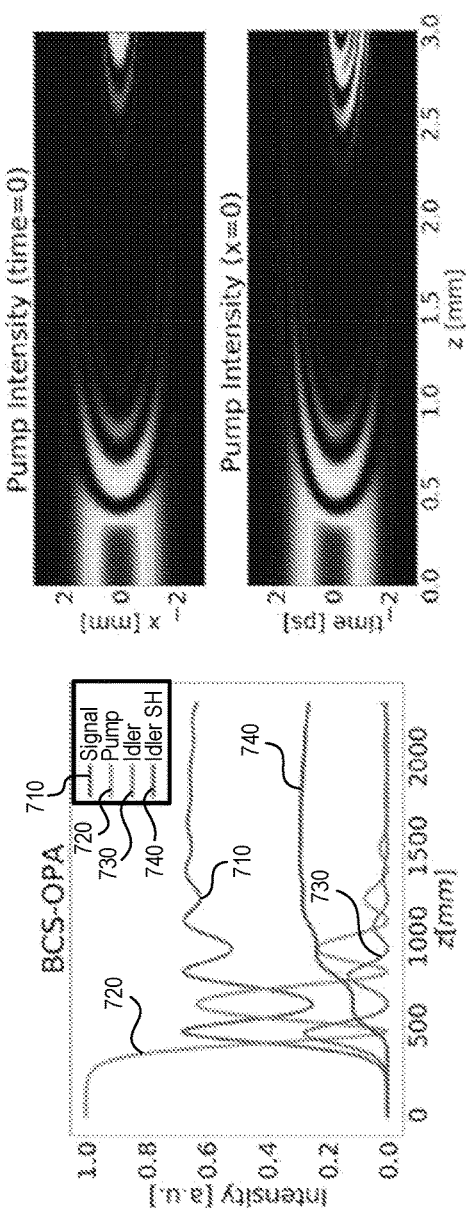
FIG. 7B
FIG. 7A
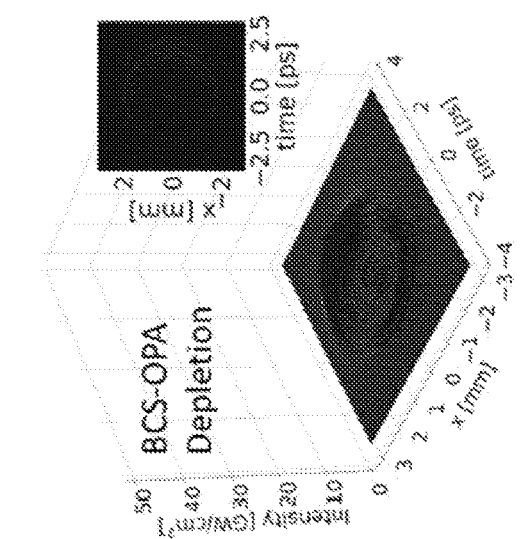
FIG. 7F
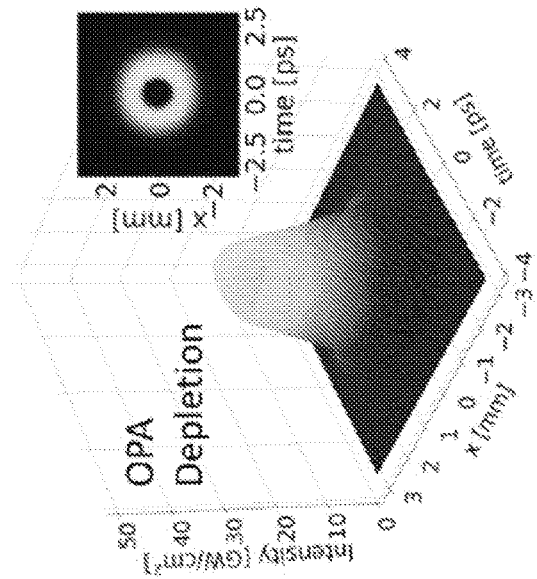
FIG. 7E
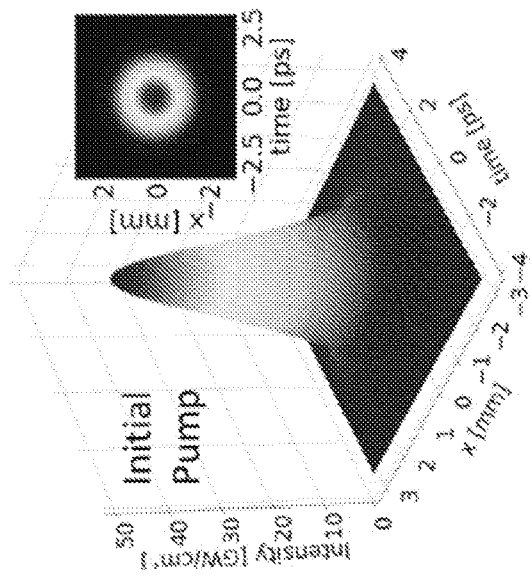
FIG. 7D

BACK-CONVERSION SUPPRESSED OPTICAL PARAMETRIC AMPLIFICATION

CROSS-REFERENCE TO RELATED APPLICATION

This patent document is a U.S. National Phase Application of PCT Application No. PCT/US2020/054317 entitled "BACK-CONVERSION SUPPRESSED OPTICAL PARAMETRIC AMPLIFICATION" filed on Oct. 5, 2020, which claims priority to and benefits of U.S. Provisional Appl. No. 62/911,149, entitled "BACK-CONVERSION SUPPRESSED OPTICAL PARAMETRIC AMPLIFICATION," filed on Oct. 4, 2019. The entire contents of before-mentioned patent applications are incorporated by reference as part of the disclosure of this document.

STATEMENT REGARDING FEDERALLY SPONSORED RESEARCH

This invention was made with government support under DMR-1719875 awarded by the National Science Foundation (NSF). The government has certain rights in the invention.

TECHNICAL FIELD

The technology disclosed in this patent document relates to amplifying optical signals based on nonlinear optical processes.

BACKGROUND

Optical parametric amplification involves using a nonlinear optical material to mix pumping light and seed light in the nonlinear optical material under proper phase matching. A nonlinear optical process inside the nonlinear optical material causes conversion of the pumping light to the wavelength of the seed light and an idler light. The idler light can undesirably mix with the seed or converted light to generate pumping light again which may be referred to as back-conversion. New techniques are needed to reduce back conversion and increase the efficiency of conversion from the pump wavelength to the seed wavelength.

SUMMARY

The technology disclosed herein can be implemented to provide efficient optical parametric amplifiers using nonlinear optical materials including nonlinear optical crystals.

In one aspect, the disclosed technology can be implemented to construct a device that includes one or more input ports structured to receive a pumping light at a pumping wavelength and receive a signal light at a signal wavelength. The device further includes one or more output ports structured to output light including an amplified signal light at the signal wavelength and a second harmonic idler light with a frequency that is a second harmonic frequency of an idler light. The device includes a nonlinear optical material positioned relative to the one or more input ports and the one or more output ports to receive and to mix the pumping light and the signal light. The nonlinear optical material is structured to cause nonlinear conversion of the pumping light into the amplified signal light at the signal wavelength and generate the idler light at an idler wavelength. The nonlinear optical material is further structured to convert the idler light into the second harmonic idler light at the second harmonic frequency of the idler light, wherein the generated second harmonic idler light eliminates the idler light at the one or more output ports and prevents back-conversion of the amplified signal light and idler light to the pumping wavelength.

In another aspect, the disclosed technology can be implemented to provide a method of optical parametric amplification. The method includes receiving a pumping light at a pumping wavelength and receiving a signal light at a signal wavelength. The method further includes generating, by a nonlinear crystal, from the pumping light an amplified signal light at the signal wavelength and an idler light at an idler wavelength. The method includes converting, by the nonlinear crystal, the idler light into a second harmonic idler light at a second harmonic frequency of the idler light, wherein the converting the idler light into the second harmonic idler light eliminates the idler light at an output, and wherein the converting the idler light into the second harmonic idler light prevents back conversion of the amplified signal light and idler light to the pumping wavelength. The method further includes outputting the amplified signal light and the second harmonic idler light.

In yet another aspect, the disclosed technology can be implemented to provide a method of optical parametric amplification. The method includes providing a nonlinear optical device structured to support (1) an optical parametric amplification process and (2) at least another nonlinear wave-mixing process associated with the optical parametric amplification process; and controlling mixing of different optical beams at different optical frequencies in the nonlinear optical device to cause simultaneous phase matching for both (1) the optical parametric amplification process and (2) the at least another nonlinear wave-mixing process.

Those and other aspects and various features of the disclosed technology are described in greater details in the drawings, the description and claims.

BRIEF DESCRIPTION OF THE DRAWINGS

FIG. 2A shows an example of a periodic quasi-phase matching (QPM) grating for phase matching optical parametric amplification (OPA) or second harmonic generation (SHG);

FIG. 2B shows an example of a composite rounded superlattice grating for both OPA and SHG;

FIG. 7A shows an example of BCS-OPA propagation dynamics taken at x=0 and time=0, showing a long region of suppressed back-conversion;

FIG. 7B shows an example of spatiotemporal pump depletion dynamics indicating the possibility of homogenous depletion at a length of 2.3 mm;

FIG. 7C shows an example of 60 dB amplification of a 2 ps full width half maximum (FWHM) transform limited signal pulse and corresponding 2 ps idler SH;

FIG. 7D shows an example of an initial spatiotemporal pump intensity profile;

FIG. 7E shows an example of an optimized final spatiotemporal pump intensity profile of a standard OPA just as back-conversion sets in, resulting in only 12% conversion;

FIG. 7F shows an example of final spatiotemporal pump profile of the BCS-OPA, resulting in 80% conversion;

DETAILED DESCRIPTION

Figure 1:
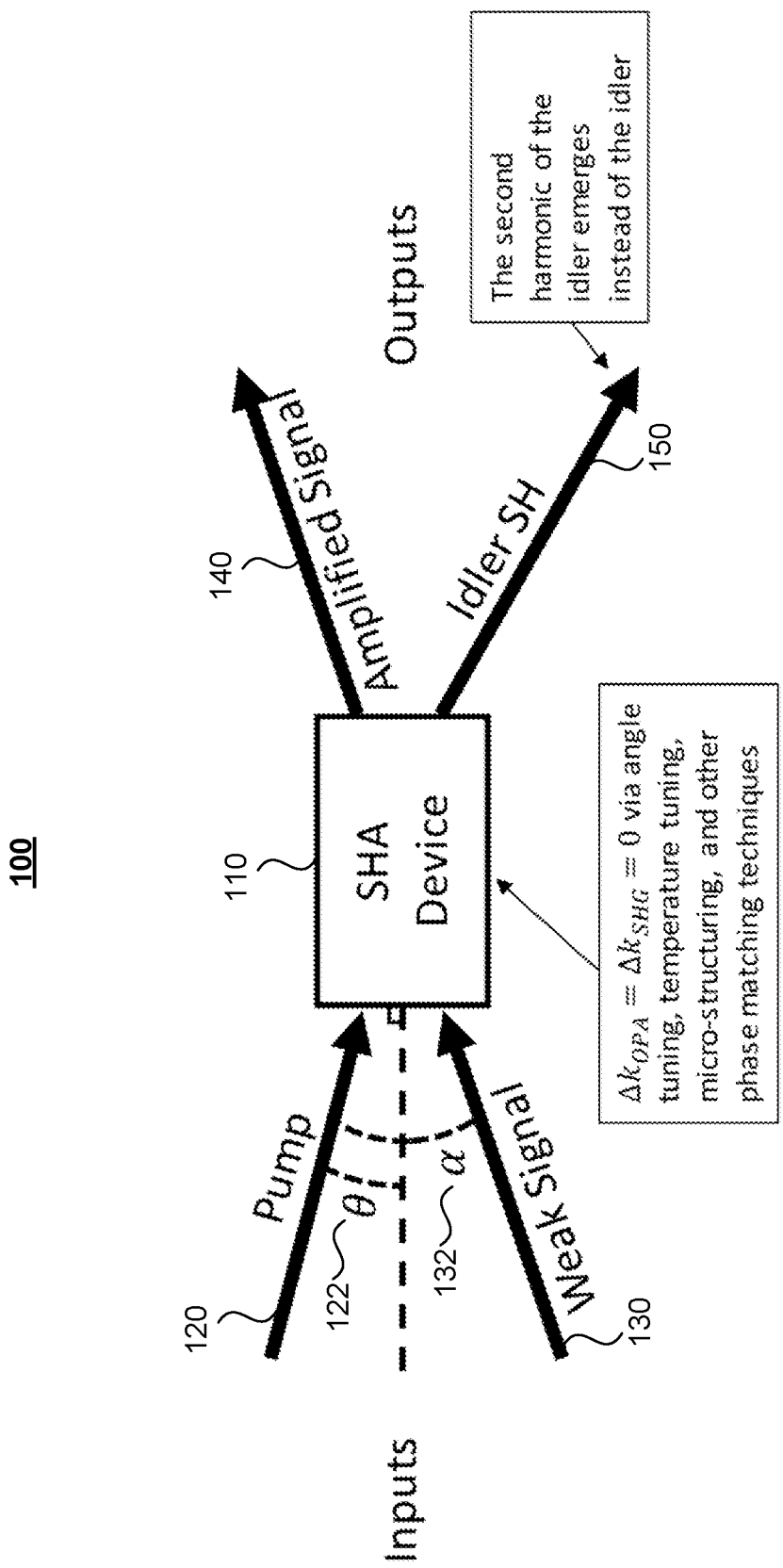
FIG. 1 shows an example of an apparatus.

Disclosed in this patent document are techniques and devices for high-efficiency optical parametric amplification (OPA) and for phase matching two or more nonlinear processes simultaneously. For example, an OPA nonlinear process and a second harmonic generation (SHG) nonlinear process are simultaneously achieved via OPA phase matching and SHG phase matching in a quasi-phase matching (QPM) structure for phase-matching of multiple wave mixing processes. Back-conversion in the OPA process is suppressed through the simultaneous second harmonic generation (SHG) process.

In some example embodiments, the OPA process involves relatively strong pump and relatively weak signal waves that converge on a nonlinear medium specifically engineered to allow simultaneous phase matching of the OPA process (in which the pump wave is converted to the signal wave, thus amplifying it, while producing an idler wave) and a secondary nonlinear wave mixing process of SHG by which the idler wave is converted to its second harmonic, thus suppressing its coupling to the pump and signal and preventing back conversion. At the output of the nonlinear medium, the amplified signal emerges along with the frequency-converted SHG beam of the idler beam. When the OPA and SHG nonlinear mixing processes are properly controlled, very little of the pump wave may emerge because it has been mostly converted to the signal and frequency-converted SHG beam of the idler beam. The amount of the residual pump wave can be used as a measure of the high efficiency of the device.

In various implementations, the disclosed technology can be used to control the phase matching conditions for two separate nonlinear wave mixing processes at the same spatial location where a pump bream, a signal beam, an idler beam, and a second harmonic beam at a frequency twice of the idler beam spatially overlap to simultaneously cause the parametric application of the signal beam and the second harmonic generation from the idler beam so that second harmonic generation is controlled to substantially deplete the energy of the idler beam during optical parametric amplification in order to suppress back-conversion of the amplified signal beam. Such simultaneous phase matching of multiple nonlinear processes in a single nonlinear media (e.g., a crystal) can be achieved using quasi-phase matching. As a specific example, a quasi-phase matched lithium niobate crystal structure is designed and simulated, which results in an order of magnitude increase in the efficiency of pump depletion for a nonlinear parametric amplifier. Such simultaneous phase matching of multiple nonlinear processes in a single nonlinear media (e.g., a crystal) can be achieved using birefringent phase matching. As a specific example, a birefringently phase matched interaction of signal, idler, and pump for OPA and simultaneously a birefringently phase matched interaction of idler and idler SH for SHG in cadmium silicon phosphide is designed and simulated, which results in an order of magnitude increase in the efficiency of pump depletion for a nonlinear parametric amplifier.

Fifty years since the creation of the first optical parametric amplifier, the problem of spatiotemporally asynchronous depletion of pump photons continues to be an obstacle in achieving near unity conversion efficiency. This problem is due to the cyclic flow of energy between waves in parametric wave mixing—known as conversion-back-conversion cycles—and the cycle period's dependence on the pump intensity and phase mismatch. This cyclical energy flow was demonstrated for imperfectly phase-matched second harmonic generation (SHG) shortly after the first demonstration of optical harmonic generation, a problem that had been anticipated in nonlinear optics from the early days of radio and microwave nonlinear parametric frequency mixing. SHG, however, is a special case of three wave mixing: eliminating phase mismatch largely suppresses back-conversion due to the indistinguishable nature of the two lower frequency waves—which ensures that they have equal photon number—and which allows relatively high conversion efficiency to be achievable. In optical parametric amplification (OPA), however, the imbalance between signal, pump, and idler photon number results in back-conversion even in a perfectly phase-matched parametric amplifier. Inhomogeneous spatiotemporal intensity thus leads to asynchronous conversion cycles across the pump's spatiotemporal extent and a different optimal crystal length for each local spatiotemporal coordinate. Since only one crystal length can be chosen, a large fraction of the incident energy must inevitably remain in the pump pulse at the output of a conversion device, resulting in an amplified signal or idler wave emerging with an energy roughly an order of magnitude lower than the initial pump, greatly increasing the cost and limiting the power of OPA systems nearly everywhere they are used.

To mitigate the problem, pulse and beam shaping have been proposed. Flattop-profile pump shaping in one or more transverse dimensions has been implemented successfully in some systems. Cascaded extraction and idealized conformal profiles have been proposed for maximizing energy conversion and amplification bandwidth. For most applications, however, pump beam or pulse shaping imparts too significant a loss to be useful. Alternatively, some recent R&D efforts have focused on forcing evolution dynamics with suppressed back-conversion. Adiabatic frequency conversion has been demonstrated in both OPA and sum- and difference-frequency generation applications with significant boosts to conversion efficiency, bandwidth, or both. Suppression of back-conversion in OPA via linear absorption of the idler wave, known as "quasi-parametric amplification," may be implemented by means of a quadratic nonlinear crystal with carefully chosen dopant material and density. Theoretical works have predicted that spatially separating the idler via noncollinear generation or lossy waveguide coupling to have a similar effect. In these works, loss of the idler from the three-wave mixing interaction following conversion of the pump to signal and idler prevents further wave mixing and thus back-conversion.

The disclosed technology is based on a novel use of nonlinear wave-mixing dynamics between four optical fields that allows near unity depletion of the pump wave in an optical parametric amplifier. To achieve "back-conversion suppressed OPA" (BCS-OPA), a simultaneously phase-matched SHG process for the idler field is introduced to prevent back-conversion of the signal. The resulting unusual dynamics for a parametric frequency converter are equivalent to those of a damped oscillator, however, there is no loss, as all energy resides at the exit of the material as the system is fully parametric. The result is the suppression of back-conversion over nearly the full spatiotemporal extent of the pump wave that requires neither a specialized material composition nor pulse pre-shaping, and appears to be general and versatile for achieving ultra-efficient OPA. Presented is an analysis of the convergence of the nonlinear system, which may be a Duffing oscillator with time-evolving restoring force and nonlinear damping. For a phase-matched system, convergence is found over the full range of system parameter and initial conditions used in practical parametric amplifiers. To illustrate the possibility of achieving practical BCS-OPA devices, numerical pulse propagation analyses is performed covering the full spatiotemporal extent of the mixing waves in both bulk and quasi-phase-matched implementations relevant to modern ultrafast laser systems. Birefringent phase matching in a cadmium silicon phosphide (CSP) crystal is predicted to allow conversion of a 2-µm, 2-ps laser to a 3-µm, 2-ps laser with 50% energy efficiency corresponding to a depletion of 80% of the pump photons. In order to facilitate BCS-OPA in QPM materials, a novel and practical superlattice domain structuring approach is described for the simultaneous phase-matching of multiple three-wave mixing processes. Analyses demonstrate that a manufacturable lithium niobate (LNB) QPM structure based on this approach can convert a 1-µm, picosecond laser pulse to sub-150-fs 1.65 µm and 1.37 µm pulses with over 65% of the pump photons depleted and over 40% of the energy converted to the 1.65 µm signal.

Optical parametric amplification with simultaneously phase-matched second harmonic generation of the unseeded wave acts as an optical parametric amplifier with suppressed back-conversion, presenting a route towards uniform spatiotemporal depletion of the pump wave and ultra-efficient amplification. Evolution of the pump wave under perfect phase matching may take the form of a Duffing oscillator with a nonlinear damping term and with damping coefficient set by the system parameters. This form in nonlinear optics leads to convergence of the pump field to zero photon number—with all photons converted to the signal and the idler's second harmonic—over the full range of initial conditions for a practical parametric amplifier. An example of implementation using birefringent phase-matching in cadmium silicon phosphide crystal is described, with pulse propagation simulations indicating that a 2-µm pump laser can amplify a 150-fs 3-µm signal pulse with over 50% energy conversion efficiency, where all pulse and beam profiles are Gaussian. To illustrate further flexibility, a novel scheme for the simultaneous quasi-phase-matching of multiple three-wave mixing processes is described. This superlattice grating structure works well for the proposed concept, and we describe an example device in lithium niobate with a manufacturable domain structure with pulse propagation simulations indicating that a 1-µm pump laser can amplify a 150-fs 1.65-µm signal pulse with over 40% energy conversion efficiency, where all pulse and beam profiles are Gaussian. The analysis suggests a widely applicable approach for increasing the conversion efficiency of routine parametric amplifier applications by several-fold.

The energy efficiency of an optical parametric amplifier (OPA) which uses a laser of one frequency to amplify light of a second, lower frequency laser is inherently low. The efficiency is typically limited to ~2-20%, depending on the application. This low efficiency is a problem in the technology, which is used widely in laser applications for both industrial and scientific purposes. This typical limitation increases the cost and limits the power of OPA systems nearly everywhere they are used. The disclosed subject matter solves this problem and will (1) significantly reduce the cost of OPA-based laser systems, and (2) allow OPA to be used effectively in a much wider range of applications.

The low efficiency of typical systems is due to back-conversion that follows amplification, which occurs at an inhomogeneous rate across the spatial beam profile and pulse (time) profile and for different frequencies. Due to this, the energy source ("pump") cannot be fully depleted by transfer of its energy to the waves to be amplified ("signal" and/or "idler").

The disclosed technology can be implemented to solve this problem by creating a way to suppress back-conversion without loss, resulting in energy conversion efficiencies of pump to signal of >50%. Additionally, this disclosed subject matter enables a new capability, the efficient generation of an idler second harmonic in quadratic media at a frequency higher than the pump, allowing OPA-based technology to not only efficiently produce powerful laser pulses at lower frequencies than the pump, but also at higher frequencies than the pump.

In this patent document, two types of quasi-phase matching (QPM) grating structures are disclosed as examples to carry out high-efficiency OPA. The two types of QPM grating structures disclosed herein are "rounded superlattice" (hereinafter, rounded superlattice) gratings and "windowed" (hereinafter, windowed) gratings.

The windowed grating design solves the more general problem of how to simultaneously phase match more than one parametric wave-mixing process. This design may be used to implement general nonlinear wave-mixing schemes beyond OPA. For example, it may also be used for applications in which one laser pulse is to be converted to two or more pulses of different colors, where the input laser frequency is shifted to more than one other frequency, or for applications in which multiple frequency shifting processes are cascaded in a single device to produce an output wavelength that could not be sufficiently generated by one wavelength shifting process alone. It may also be used for applications in which a set of laser pulses with different frequencies must be converted to a new set of laser pulses with shifted frequencies.

Applications of windowed QPM gratings include wavelength multiplexing for telecommunications, red-green-blue generation for display technology, the shifting of a laser wavelength to another wavelength very far away from the original for scientific or industrial purposes, and the production of multiple entangled photons for quantum trits (qutrits) or higher number-base quantum digits (qudits) for quantum computing or quantum information processing (and others).

Back-conversion limited efficiency of an OPA is solved using the disclosed subject matter. The disclosed techniques and devices are suitable for wide adoption in the field.

Some solutions rely on absorption of the idler through a secondary linear optical process. The disclosed subject matter, in contrast, involves no absorption and no loss (a primary advantage), and involves the use of a secondary nonlinear optical process, second harmonic generation, to prevent the idler from recombining with the signal, thus averting back-conversion. With respect to implementation, the related technology requires a dedicated nonlinear medium with dopant added for idler absorption. This is a limiting factor, as appropriate dopants for particular applications may not be realizable. In the disclosed subject matter, no dopant is required. The disclosed subject matter requires, instead, a dedicated nonlinear medium that can simultaneously phase match the OPA process and a secondary nonlinear wave mixing process involving the idler wave. This can be achieved in many ways, as listed below.

Some solutions rely on a waveguided geometry where the idler wave can be partially removed from the OPA process through linear coupling, arresting back-conversion. This limits the scope of the invention to waveguided devices. In contrast, the disclosed subject matter does not rely on a waveguide (though it can take place within a waveguide) and does not employ separation of the idler wave from the OPA. Rather, in the disclosed subject matter, the idler remains co-propagating with the OPA, but is converted to another frequency that is no longer coupled to the OPA process. The disclosed subject matter can in principle take place in any nonlinear medium where simultaneous phase-matching of OPA and second harmonic generation involving the idler can be achieved.

Some solutions rely on a dedicated medium with a tilted quasi-phase-matching structure designed to spatially separate the idler beam from the pump and signal beams, thus arresting back-conversion. In contrast, the disclosed subject matter does not rely on spatial separation of the idler beam from the OPA process. In the disclosed subject matter, the idler beam remains co-propagating with the OPA, but is converted to another frequency that is no longer coupled to the OPA process. Moreover, this related technology requires two tilted quasi-phase-matching structures with a bulk medium in between. The disclosed subject matter does not require a tilted quasi-phase-matching structure (though it may employ a quasi-phase-matching structure of a different type for the quite different purpose of simultaneously phase-matching the OPA process and second harmonic generation of the idler) and is monolithic.

Some solutions do not suppress back-conversion in order to improve conversion efficiency, making some fundamentally different in mechanism from that of the disclosed subject matter. Instead, it makes the conversion-back-conversion cycles across the spatiotemporal extent of the interacting waves more homogeneous. These solutions require pre-shaping of the pump beam and/or pump pulse to a flattop shape or another special shape to achieve improved efficiency, a disadvantage since pre-shaping is usually lossy, ultimately reducing the overall efficiency of the OPA. The disclosed subject matter does not require beam shaping or any other lossy component.

Some other solutions do not suppress back-conversion in order to improve conversion efficiency. These solutions employ a first stage with high conversion efficiency at the edges of the interacting beams and strong back-conversion at the centers, followed by a second conversion stage with high conversion efficiency at the beam centers, resulting in a high net conversion at the second stage output. In the disclosed subject matter, this "cascaded extraction" method is not used. This related technology requires a specialized coating at the output face of the second stage to reflect and separate the idler wave. In contrast, in the disclosed subject matter, conversion takes place in a single stage and no specialized coatings for separation of the idler wave are needed.

Some solutions partially suppress back-conversion through use of a slowly chirped (longitudinally increasing or decreasing) quasi-phase-matching grating period, frequencies are sequentially converted without back-conversion, but with a limited (not full) efficiency. In this approach, the wave-mixing process begins poorly phase matched, and is swept through a perfect phase matching condition until it is poorly phase matched again. Conversion efficiencies have been achieved that are slightly higher than a standard OPA. In contrast, the disclosed subject matter does not employ a swept phase-matching condition but rather a constant one, and the disclosed subject matter does not employ a chirped-quasi-phase-matching grating as a possible implementation. In the disclosed subject matter, the back-conversion suppression occurs solely due to the simultaneous phase-matching of second harmonic generation.

The technique of tiling is different from both the disclosed rounded superlattice grating implementation and the disclosed windowed grating. Tiling has the disadvantage that only a single process is perfectly phase matched at a time while the other process is severely phase mismatched, a characteristic that we find makes it harder to implement in the disclosed high-efficiency OPA. In general, this makes tiling poorly suited for nonlinear wave mixing dynamics that requires simultaneous phase matching of two or more parametric wave mixing processes. In contrast, the disclosed rounded superlattice grating implementation balances the phase matching of multiple processes. The windowed grating approach results in a piece-wise phase-matching that switches back and forth between the phase matching of each process. However, windowed method offers a straightforward method for changing the relative heights of each QPM Bragg peak, which allows a new degree of control of the relative amounts of each phase-matched parametric wave mixing process that occurs in a device.

Multiple-channel technology can be used for phase matching but has disadvantages including not allowing arbitrary choice of the effective grating periods of the device as the periods must be commensurate. Both the disclosed rounded superlattice implementation and windowed grating allow arbitrary choice of the effective periods. A difference between the rounded superlattice grating implementation and multi-channel technology is the use of a domain rounding procedure. This rounding procedure allows non-commensurate effective grating periods to be encoded in a structure having only one domain size. The result is a device that simultaneously allows arbitrary choice of effective grating periods and an easily manufacturable grating structure.

Some solutions using optimization algorithms to find arbitrary structures with QPM grating Bragg peaks in the correct locations are rendered impractical due to manufacturing constraints on minimum domain size, resolution, and variability. In contrast, the disclosed techniques and devices result in manufacturable structures.

FIG. 1 depicts an example of an OPA system 100, in accordance with some example embodiments. An optical pump source 120 is incident to the second harmonic amplifier (SHA) device 110 at an angle, $\theta$ at 122. A weak signal 130 is incident to the SHA device at an angle, $\alpha$ at 132, relative to the pump angle, $\theta$. As described in this patent document, the SHA device 110 material, angles $\alpha$ and $\theta$ are selected to cause phase matching for two nonlinear processes, OPA and SHG of the idler. Exiting the SHA device 110 is an amplified signal 140 which is light at the same wavelength as the weak signal input 130 but with a higher power than the weak signal 130. Also exiting the SHA device 110 is light at the second harmonic (at twice the frequency of the idler, half the wavelength of the idler) of the idler generated in the SHA device 110.

Figure 5A:
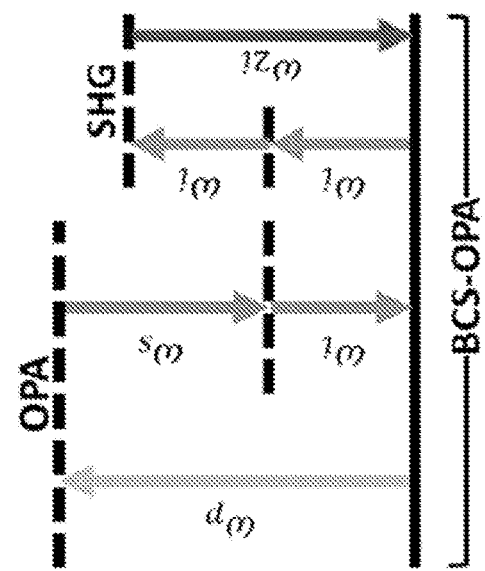
FIG. 5A shows an example photon energy exchange diagram for BCS-OPA illustrated by simultaneous OPA and SHG of the idler.

As an illustrative example, a particular application may require a particular amplified signal wavelength. A weak signal 130 at the signal wavelength is input into the device 110. Based on the signal wavelength, the SHA device 110 crystal and pump wavelength can be selected. The idler wavelength is then determined based on the energy relationship shown in FIG. 5A. In order for the weak input signal to be amplified, the OPA nonlinear phase matching conditions must be met. These conditions include relationships between the crystal structure of device 110, the pump and signal wavelengths, and the angles between the beams and device 110. In order for the idler light generated by the OPA nonlinear process to be upconverted to the second harmonic of the idler light, the phase matching conditions for SHG must also be met. An advantage of converting the idler beam to the second harmonic of the idler beam is that this prevents back conversion from the idler back to the pump, thereby increasing the efficiency of the amplification of the weak signal to the amplified signal. In order for the both OPA and SHG to occur, the phase matching conditions for OPA and SHG must be met simultaneously. In order to tune the device 110 to meet one or both of the OPA and SHG phase matching conditions, various phase matching techniques are described below. As examples, angles $\alpha$ and $\theta$ can be adjusted, the temperature of the crystal can be controlled, birefringent phase matching, or quasi-phase matching may be used to meet one or more of the phase matching conditions.

As a specific example, quasi-phase matching is an approximation to perfect phase matching that will satisfy the OPA and SHG phase matching conditions. QPM can be implemented as a grating. For example, FIG. 2A shows two poled gratings, one for phase matching OPA and a second for phase matching SHG. FIG. 2B shows an interleaved poling structure that interleaves the poling structures for OPA and SHG. The interleaved poling structure of FIG. 2B can simultaneously meet the phase matching conditions for OPA and SHG.

The disclosed OPA involves relatively strong pump and relatively weak signal waves that converge on a nonlinear medium specifically engineered to allow simultaneous phase matching of the OPA process (in which the pump wave is converted to the signal wave, thus amplifying it, while producing an idler wave) and a secondary nonlinear wave mixing process by which the idler wave is converted to its second harmonic, thus suppressing its coupling to the pump and signal. At the output of the nonlinear medium, the amplified signal emerges along with the frequency-converted idler beam. Very little of the pump wave emerges because it has been mostly converted to the signal and frequency-converted idler, which is the measure of the high efficiency of the device.

The disclosed subject matter can be employed in any medium that can be simultaneously phase-matched for OPA and second harmonic generation of the idler. The idler is automatically converted by the second harmonic generation process to a wave of another frequency during saturation of the amplification of the signal, thus arresting back-conversion of the signal and idler waves to the pump wave. This occurs sequentially for all portions of the beam, beginning with the portion (typically the center) that has the highest gain coefficient and followed by portions with low gain. Since no back-conversion occurs, the highest gain region remains converted while the lower gain regions catch up, until the entire spatiotemporal extent of the wave is converted.

Media that can support multiple phase-matched nonlinear wave-mixing processes include but are not limited to (i) bulk birefringent media with carefully chosen cut-angle and interacting wave frequencies specifically chosen to allow simultaneous phase matching, (ii) periodically poled quasiphase-matching gratings with carefully chosen poling period and interacting wave frequencies specifically chosen to allow simultaneous phase matching, (iii) aperiodically poled quasi-phase-matching gratings with longitudinal grating structure engineered to allow simultaneous phase matching (for example, by the two novel approaches outlined as our two QPM structures), (iv) a waveguide of other form with waveguide dispersion tailored by means of its structural design to allow simultaneous phase matching, (v) any of the above methods where the dispersion of the medium is also tuned by controlling its temperature.

Example Implementations

Numerical simulations are performed for the simultaneous OPA and SHG processes and predict very high conversion (up to ~80% of the pump converted to signal and frequency-converted idler.) Two specific device implementation examples are described, one using the rounded superlattice QPM grating approach to simultaneously phase-match the OPA and SHG processes, and another using birefringent phase matching.

In both implementations, the nonlinear wave mixing causes each pump photon to split into a set of lower frequency signal and idler photons by the quadratic nonlinear susceptibility of the medium, and signal and idler fields grow coherently because the process is phase matched. Simultaneously, two idler photons can combine to produce one new photon of twice their frequency, and this idler second-harmonic (SH) can grow coherently because the process is also phase matched (see, for example, FIG. 5A). The process initially proceeds as conventional OPA where signal and idler photons are generated from the pump. As the strength of the idler field grows, the SHG process displaces idler photons to their second harmonic field, decoupling them from the OPA process. A general feature is that these dynamics play out independent of the initial pump intensity, leading to an asymptotic approach to full pump depletion, suppressing OPA back-conversion with all pump photons converted to the signal and the idler SH (see, for example, FIG. 5B). This suppression of back-conversion and its largely independent relationship to the pump intensity allows for nearly full spatiotemporal conversion.

Figure 9A:
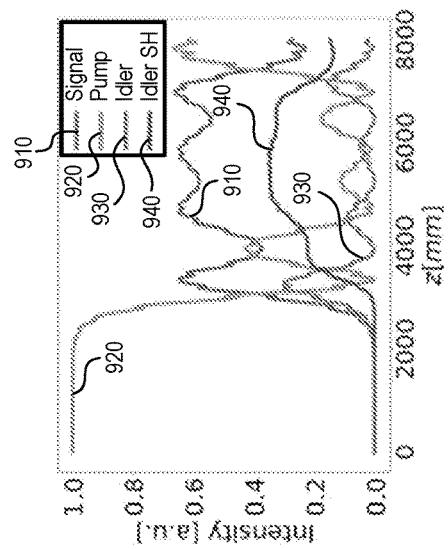
FIG. 9A shows an example of BCS-OPA propagation dynamics in a QPM device taken at x=0 and time=0, showing a long region of suppressed back-conversion.
Figure 9B:
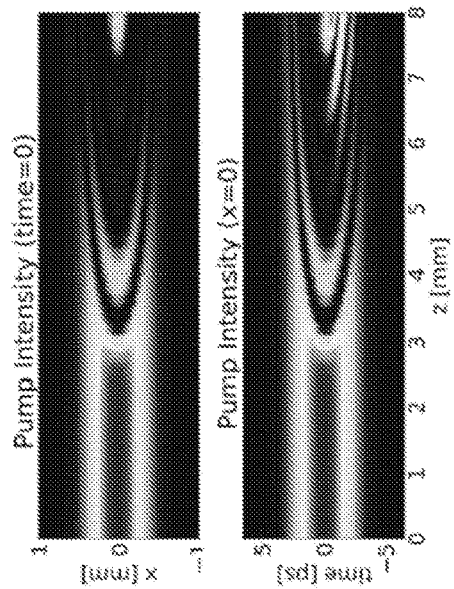
FIG. 9B shows an example of spatiotemporal pump depletion dynamics in a QPM device, indicating the possibility of homogenous depletion at a length of 6.8 mm.
Figure 9C:
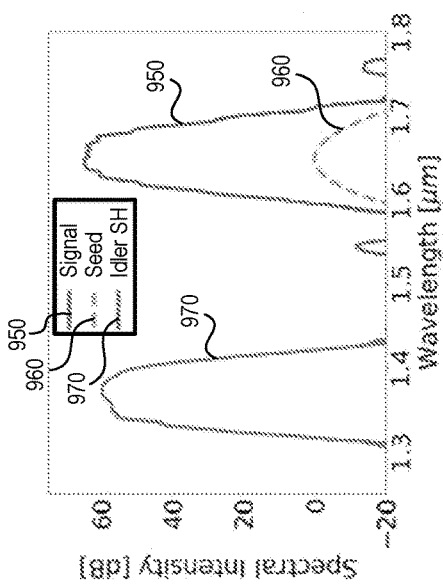
FIG. 9C shows an example of 60 dB amplification of a 140 fs FWHM transform limited signal pulse and corresponding 140 fs idler SH for the second harmonic signal (SH) of the idler.
Figure 9D:
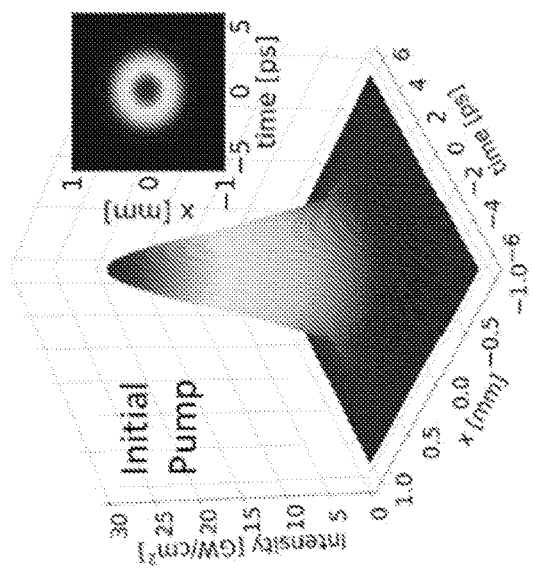
FIG. 9D shows an example of initial spatiotemporal pump intensity profile in a QPM device.
Figure 9E:
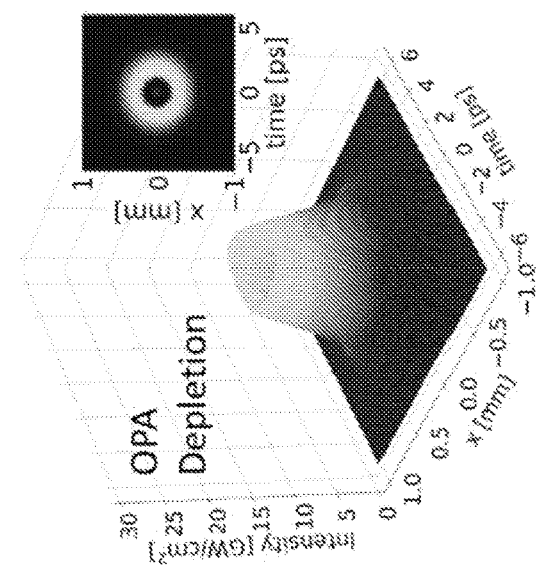
FIG. 9E shows an example of optimized final spatiotemporal pump intensity profile of a standard OPA just as back-conversion sets in, resulting in a conversion of only 14%.
Figure 9F:
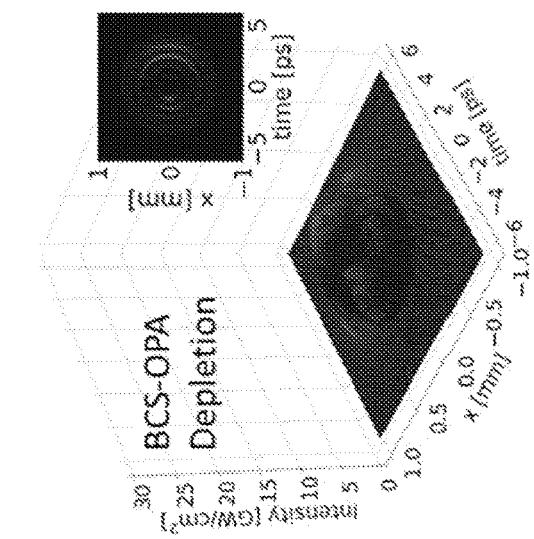
FIG. 9F shows an example of final spatiotemporal pump profile of the BCS-OPA, resulting in 65% conversion.

As shown in FIGS. 9B and 9F, at the output of the device (at 6.8 mm) there is nearly full depletion of the pump along its full spatiotemporal extent. Simulations of this device demonstrate 65-80% of the pump energy depleted, and 40-50% of the energy converted to the signal. This is compared to the standard OPA implementation (without a simultaneously phase-matched secondary wave-mixing process and thus without back-conversion suppression, see, for example, FIG. 9E), which has only 14% pump depletion and 9% energy conversion to the signal. The back-conversion suppressed OPA process disclosed herein is thus approximately 5 times more energy efficient. In some example implementations, for the case of birefringent phase matching, more than 50% of the energy of a pump pulse at the 2-micron wavelength is converted to the signal pulse at the 3-micron wavelength (see, for example, FIG. 7F).

FIGS. 2A and 2B show an example of a rounded superlattice grating design described in this patent document. FIG. 2A shows an example of a periodic QPM grating for phase matching OPA or SHG. FIG. 2B shows an example of a composite rounded superlattice grating for phase matching both OPA and SHG.

Figure 3A:
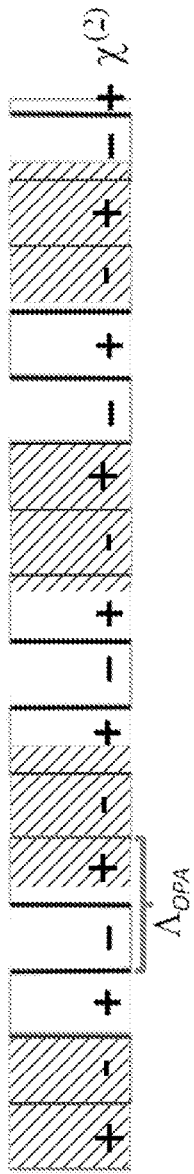
FIG. 3A shows an example of a periodic QPM grating for phase matching OPA.
Figure 3B:
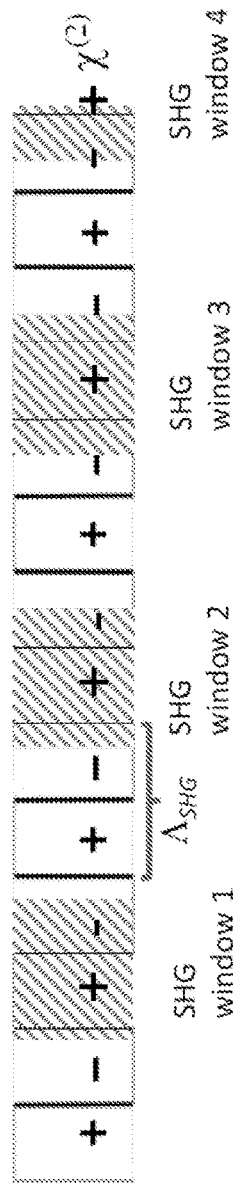
FIG. 3B shows an example of a periodic QPM grating for phase matching second harmonic generation (SHG)
Figure 3C:
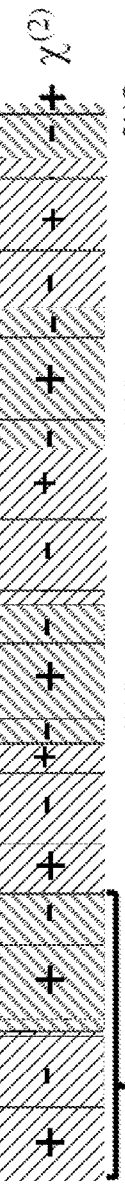
FIG. 3C shows an example of a windowed QPM grating for simultaneously phase matching OPA and SHG.

FIG. 3A shows an example of a periodic QPM grating for phase matching OPA. FIG. 3B shows an example of a periodic QPM grating for phase matching SHG as described in this patent document. FIG. 3C shows an example of a windowed grating for phase matching both OPA and SHG as described in this patent document.

Examples Variations in the Implementations

The following are some variations to the example implementations.

(a) Where the idler SH wave is the desired beam, rather than the signal. As there is high conversion efficiency to both of these beams, the disclosed subject matter provides a new way to efficiently generate light at the idler SH frequency. As the idler SH can be at a frequency higher than the pump, this provides a novel way to produce efficient frequency up-conversion in a quadratic nonlinear medium.

(b) As in the example implementation, but where the signal beam is converted to its SH instead of the idler. SHG of the signal prevents back-conversion of the idler to the pump, resulting in a high conversion efficiency to the idler wavelength and to the signal SH wavelength.

(c) As in (b), but where the desired beam is the signal SH. As the signal SH can be at a frequency higher than the pump, this provides a novel way to produce efficient frequency up-conversion in a quadratic nonlinear medium.

(d) As in the example implementation and (a) through (c) above, but where the conversion device is a bulk birefringent quadratic nonlinear medium (without a quasi-phase-matching grating) and the conversion takes place due to a carefully chosen cut-angle, and/or temperature, and interacting wave frequencies, angle between pump and signal waves, and wave polarizations specifically chosen to allow simultaneous phase matching given the dispersion of the medium.

(e) As in the example implementation and (a) through (c) above, but where the conversion device is a periodically poled or other quasi-phase-matching grating and the conversion takes place due to a carefully chosen grating structure, and with interacting wave frequencies, angle between pump and signal waves, and wave polarizations specifically chosen to allow simultaneous phase matching given the dispersion of the medium. In some implementations, temperature is also chosen to adjust phase matching.

(f) The use of any of the devices described above with a third simultaneously phase-matched process in order to more efficiently generate the desired wave. For example, in (c), the signal SH can be used to further amplify the idler through another OPA process.

Applications

The disclosed technology can be used to perform optical amplification by OPA wherever it is already used, now at a much higher efficiency. It can also provide a new route to efficient optical frequency upconversion, with a much higher efficiency than traditional upconversion techniques (e.g., sequential OPA and SHG or SFG). It will also increase the range of applications where OPA can be useful and cost-effective.

This has the potential to benefit a myriad of applications, both scientific and industrial, that use OPA to convert laser light to new frequencies. Some applications include sources and amplifiers for telecommunications and optical information processing, medical imaging, machining, scientific research, LIDAR, directed energy, and up-conversion detection and up-conversion imaging.

It also has the potential to allow new applications of nonlinear wave-mixing for information processing in a fiber telecommunications or integrated photonics platform (e.g., using waveguided lithium niobate). Such applications may include, for example, all-optical switching, and frequency multiplexing and de-multiplexing.

The QPM grating devices may also be used for applications in which one laser pulse is to be converted into many pulses of different colors, where the input laser frequency is shifted to more than one other frequency, or for applications in which multiple frequency shifting processes are cascaded in a single device to produce an output wavelength that could not be sufficiently generated by one wavelength shifting process alone. Applications of this device could include wavelength multiplexing for telecommunications, red-green-blue generation for display technology, the shifting of a laser wavelength to another wavelength very far away from the original for scientific or industrial purposes, and the production of multiple entangled photons for quantum trits (qutrits) or higher number-base quantum digits for quantum computing or quantum information processing (and others).

Asynchronous Pump Depletion

Figure 4A:
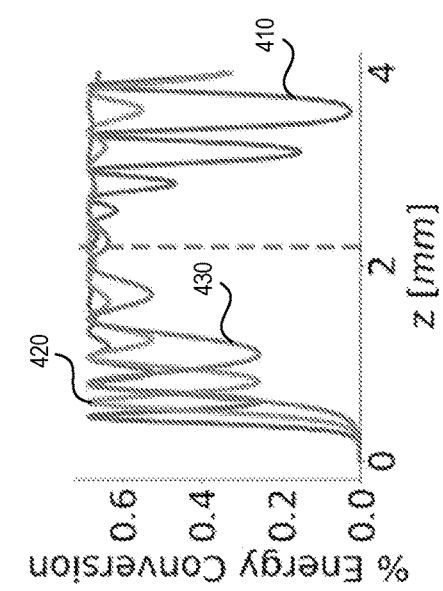
FIG. 4A shows an example of conversion of the pump to the signal and subsequent back-conversion/conversion cycles with period that depends on the intensity in OPA.
Figure 4C:
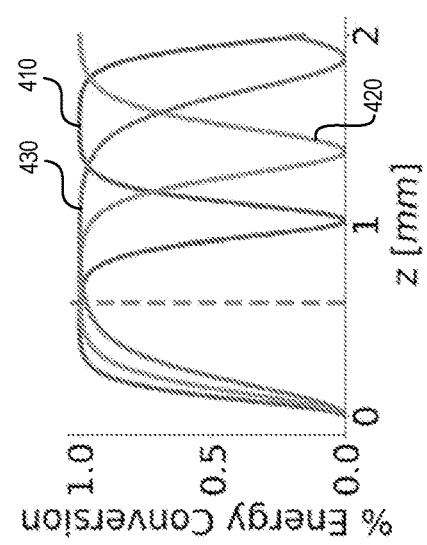
FIG. 4C shows an example of conversion dynamics in nearly phase-matched SHG, which has wide saturation regions.
Figure 4E:
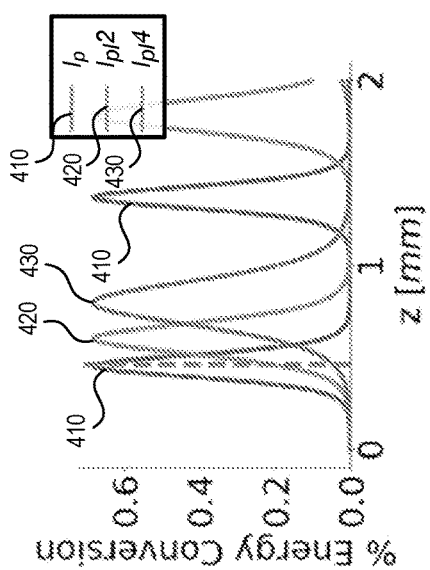
FIG. 4E shows an example of back conversion suppression optical parametric amplification (BCS-OPA) which damps out back conversion cycles to enable simultaneous conversion of different pump intensities.
Figure 4B:
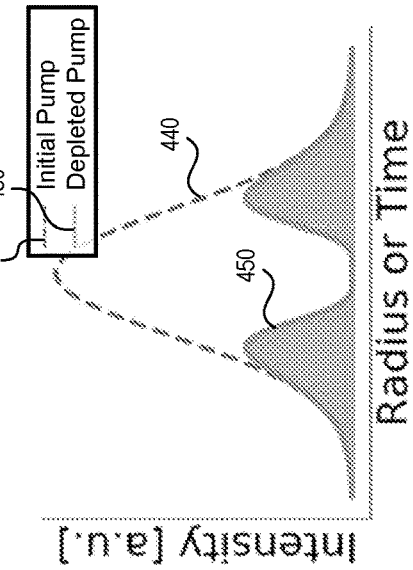
FIG. 4B shows an example of depletion of the pump in OPA, where conversion occurs in the peak of the OPA pump well before the wings are depleted, compromising the efficiency in conversion of the pump energy.
Figure 4D:
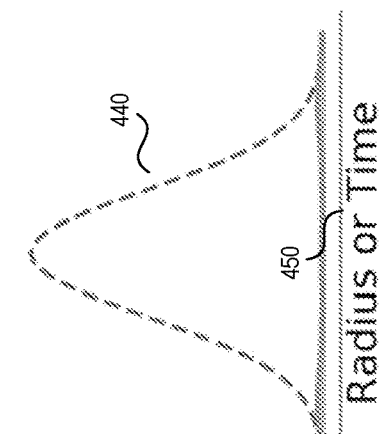
FIG. 4D shows an example of most of the fundamental intensity profile depleted for an SHG process because of the wide saturation regions of nearly phase-matched SHG.

The dynamics of perfectly phase-matched OPA do not exhibit back-conversion suppression or high spatiotemporal pump depletion. The initial conditions of OPA require a relatively high incident pump field, a relatively small incident signal field and zero initial idler field. Under this configuration, energy flows from the pump field to the signal and idler fields until fully depleted, but the simultaneous presence of both signal and idler fields forces energy to flow back to the pump field through sum frequency of the signal and idler fields until the idler is fully depleted—starting the process over again (FIG. 4A). FIG. 4A shows an example of conversion of the pump to the signal and sub-sequent back-conversion/conversion cycles with period that depends on the intensity in OPA. This prevents efficient conversion across the spatial and temporal extents of the pump and signal due to the sharp conversion peaks and variation of intensity across the spatial and temporal extents of the pump and signal. The saturation region is short in this case because the large signal and idler amplitudes drive strong back-conversion to the pump as soon as it is depleted. Since the crystal length at which this short saturation region occurs is highly dependent on the pump intensity, asynchronous depletion across the pump spatiotemporal profile occurs (FIG. 4B), severely limiting the OPA conversion efficiency. The dashed line in FIGS. 4A, 4C, and 4E represent the conversion position for optimal pump depletion shown in FIGS. 4B, 4D, and 4F.

Dynamics of Back-Conversion Suppressed OPA (BCS-OPA)

Figure 5B:
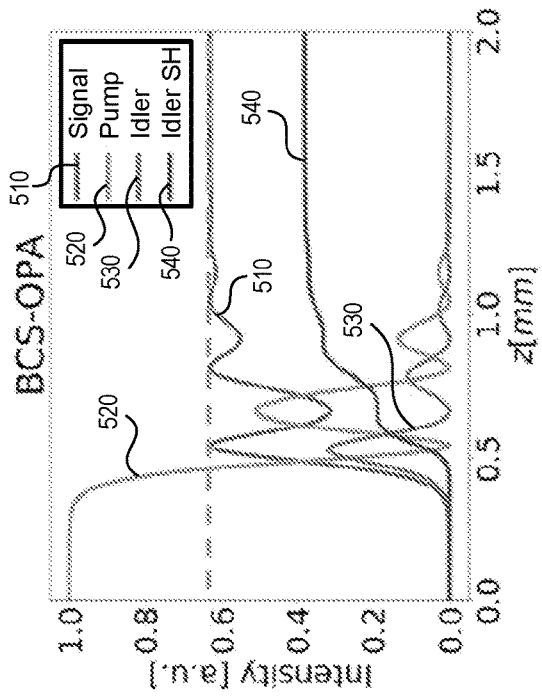
FIG. 5B shows an example of evolution dynamics of BCS-OPA, where the idler is converted to its second harmonic during OPA gain saturation.
Figure 5C:
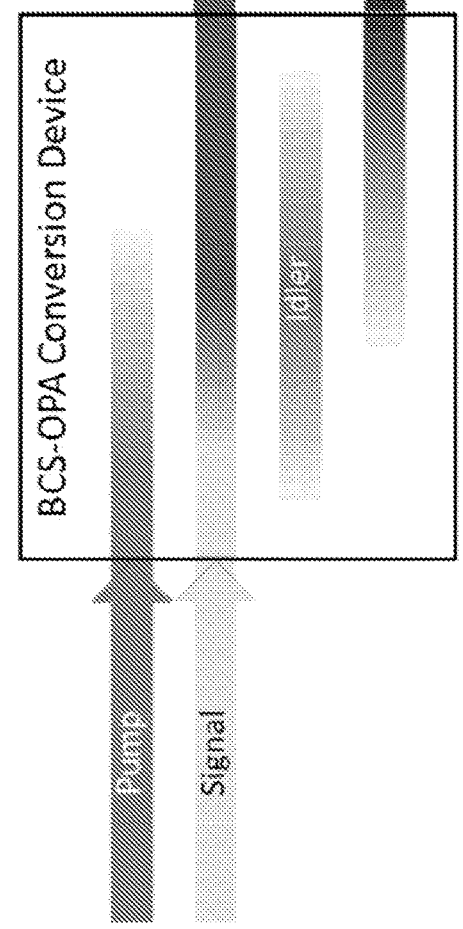
FIG. 5C shows an example schematic for a BCS-OPA device showing conversion dynamics within the nonlinear medium.

To achieve SHG-like back-conversion suppression and promote a unidirectional flow of energy from the pump to the signal field in OPA, the coupled wave equations are modified to allow the possibility of achieving $dA_j/dz=0$ for every $A_j$ involved. In the disclosed approach, the parametricity of the process is conserved, which suggests modifying the coupled wave equations by introducing additional parametric wave mixing. One way to do this is to simultaneously deplete the idler of the OPA through a secondary SHG process. Incorporating SHG of the idler field into the model results in coupled evolution equations for the four waves involved in the two simultaneous nonlinear processes (FIG. 5A), given by:

$$d_z A_s = i\frac{\omega_s d_{eff}}{n_s c} A_p A_i^* e^{i\Delta k_{OPA} z} \quad \text{EQ. (1)}$$

$$d_z A_p = i\frac{\omega_p d_{eff}}{n_p c} A_s A_i e^{-i\Delta k_{OPA} z} \quad \text{EQ. (2)}$$

$$d_z A_i = i\frac{\omega_i d_{eff}}{n_i c} A_p A_s^* e^{i\Delta k_{OPA} z} + i\frac{\omega_i d_{eff}}{n_i c} A_{2i} A_i^* e^{i\Delta k_{SHG} z} \quad \text{EQ. (3)}$$

$$d_z A_{2i} = i\frac{\omega_{2i} d_{eff}}{2n_{2i} c} A_i^2 e^{-i\Delta k_{SHG} z} \quad \text{EQ. (4)}$$

where $A_j$, $\omega_j$, and $n_j$ are the signal, pump, idler, and idler second harmonic electric field amplitudes, angular frequencies, and indices of refraction respectively. The effective nonlinear coefficient, $d_{eff}$ is assumed to be identical between the OPA and SHG processes. The OPA phase mismatch is given by $\Delta k_{OPA}=k_p-k_s-k_i$ and the SHG phase mismatch is given by $\Delta k_{SHG}=k_{2i}-2k_i$. When $|\Delta k_{SHG}|\gg 0$, the system reduces to that of ordinary OPA, and numerical integration of the equations results in the usual OPA conversion cycle dynamics (FIG. 4A). When $\Delta k_{SHG}\cong 0$, nonlinear attenuation of the idler is induced through coupling to its second harmonic (SH). FIG. 5B shows an example of evolution dynamics of BCS-OPA, where the idler is converted to its second harmonic during OPA gain saturation, preventing signal back-conversion and converting all pump energy to signal and idler second harmonic. The quantum defect (dashed line) sets the upper limit on conversion efficiency. FIGS. 5B and 5C illustrate the wave-mixing evolution dynamics for this process: since the rate of idler SHG outpaces idler amplification only during saturation of the amplifier, signal amplification persists until the onset of saturation, at which point damped oscillations of energy between the four waves takes place, with an overall asymptotic approach to full depletion of the pump. The BCS-OPA process requires creation of one signal photon for each annihilated pump photon, resulting in a maximum signal field intensity limited by the initial pump intensity times the quantum defect, no different than ordinary OPA. For a long propagation length, this maximum efficiency is obtained without back-conversion.

Figure 4F:
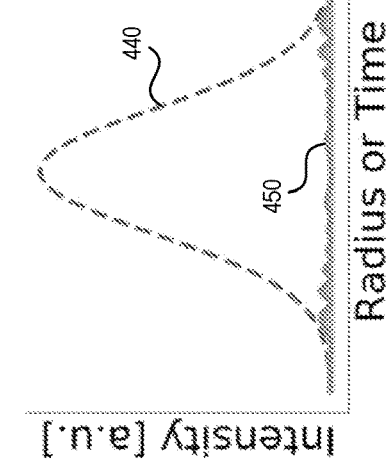
FIG. 4F shows that as in SHG nearly the full pump intensity profile can be depleted in BCS-OPA.

In the disclosed scheme, this dynamical behavior is independent to the local intensity along the spatiotemporal extent of the pump wave. That is, the SHG naturally possesses a slower growth rate than the exponential parametric gain experienced by the idler prior to the onset of gain saturation—a general feature that it is independent of the chosen pump intensity and thus occurs along each spatiotemporal coordinate (FIG. 4E). The local pump intensity only affects the length at which near-full signal amplification occurs. Thus, the suppression of back-conversion together with its largely independent relationship to the pump intensity allows for nearly full spatiotemporal conversion (FIG. 4F).

BCS-OPA as a Damped Duffing Oscillator

The influence of system parameters and initial conditions on phase matched BCS-OPA dynamics can be studied by non-dimensionalizing EQs. (1) to (4):

$$d_\zeta u_s = i u_p u_i^* \quad \text{EQ. (5)}$$

$$d_\zeta u_p = i u_s u_i \quad \text{EQ. (6)}$$

$$d_\zeta u_i = i u_p u_s^* + i\delta u_{2i} u_i^* \quad \text{EQ. (7)}$$

$$d_\zeta u_{2i} = i\frac{\delta}{2} u_i^2 \quad \text{EQ. (8)}$$

where we have substituted $$\zeta = \sqrt{\frac{\hbar \omega_p \omega_s \omega_i d_{eff}^2 F_0}{2 n_p n_s n_i \epsilon_0 c^3}} z, \delta = \sqrt{\frac{n_p n_s \omega_i \omega_{2i}}{n_i n_{2i} \omega_p \omega_s}}, \text{ and } u_j = \sqrt{\frac{2 n_j \epsilon_0 c}{\hbar \omega_j F_0}} A_j.$$

$\zeta$ is a nondimensional propagation coordinate. $\delta$ is found to behave as a damping constant on OPA conversion-back-conversion cycles. The total initial photon flux is given by $F_0$ so $|u_j|^2$ may be interpreted as the percentage of photons in the $j^{th}$ field relative to the total number of initial photons which we will refer to as the photon balance of the $j^{th}$ field. It is assumed that the system is initialized under typical OPA operating conditions with most of the photons in the pump field and the remaining photons in the signal field. In terms of photon balance, the Manley-Rowe equations are given by:

$$1 = |u_p|^2 + |u_s|^2 \quad \text{EQ. (9)}$$

$$|u_{p,0}|^2 = |u_p|^2 + |u_i|^2 + 2|u_{2i}|^2 \quad \text{EQ. (10)}$$

$$|u_{s,0}|^2 = |u_s|^2 - |u_i|^2 - 2|u_{2i}|^2 \quad \text{EQ. (11)}$$

where $|u_{p,0}|^2$ and $|u_{s,0}|^2$ are the initial pump and signal photon balance, respectively.

The conversion dynamics of BCS-OPA can be understood by differentiating EQ. (6) w.r.t. $\zeta$, and combining with EQs. (5), (7), (9), and (10). Then all $u_j$ except those of the pump and idler SH are eliminated:

$$d_\zeta^2 u_p = -(1 + |u_{p,0}|^2 - 2|u_{2i}|^2) u_p + 2u_p^3 - \delta |u_{2i}| d_\zeta u_p \quad \text{EQ. (12)}$$

where it is assumed $u_p$ and $u_s$ are initially real and positive, from which it follows that $u_i = -u^*_i$ and $u_{2i} = -i|u_{2i}|$. Equation (12) is the force equation of a damped Duffing oscillator. The first term represents a linear restoring force that decreases with an increasing number of second harmonic photons, the second term acts as a nonlinear softening of the restoring force, and the third term results in damping that increases with an increasing number of second harmonic photons.

Numerical Methods

The BCS-OPA conversion and pulse propagation dynamics were modelled using a split-step Fourier numerical method. The model captures the dispersion and temporal dynamics of the conversion process as well as 1D in the transverse spatial dimension where collinearity and rotational circular symmetry about the propagation axis of the pulses is assumed. For each system in which we simulated BCS-OPA, additional simulations were run under identical initial conditions for conventional OPA by removing the coupling between the idler and its second harmonic field.

In the simulations, the pump spatiotemporal profile is 1st-order Gaussian in both temporal and spatial extent. The peak intensity is chosen to be below the damage threshold of the medium in each nonlinear medium. The optimal conversion length was chosen in each case to coincide with the onset of back conversion at the peak of the pumps spatiotemporal profile.

Birefringent Phase Matching in Cadmium Silicon Phosphide (CSP)

BCS-OPA was demonstrated by means of birefringent phase matching in a device that is predicted to allow over 50% energy conversion efficiency in an amplifier at 3.0 μm signal wavelength, pumped at the Ho:YLF and Tm:fiber gain media wavelength of 2.05 μm. Thus, for example, if one possesses a picosecond, 2.05 μm, 1-mJ laser and wants a 3.0-μm laser instead, 0.5 mJ rather than the 0.1-0.2 mJ obtained conventionally in OPA, a pulse energy of more than 0.5 mJ can be achieved.

Figure 6:
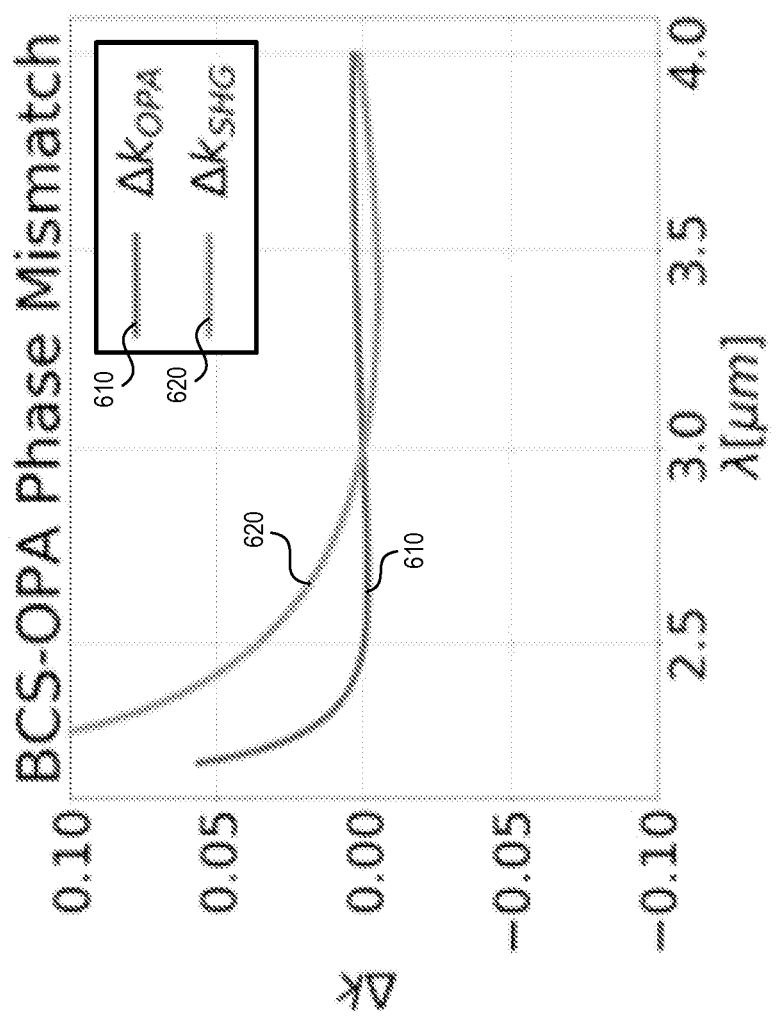
FIG. 6 shows examples of birefringent phase matching curves, indicating an operating point for a BCS-OPA device where the curves cross.

High efficiency BCS-OPA requires simultaneous phase matching of OPA and idler-SHG processes. To achieve this, the joint phase-matching condition $\Delta k_{OPA} = \Delta k_{SHG} = 0$ must be satisfied for the desired wavelengths for some orientation of the nonlinear medium. This occurs in cadmium silicon phosphide (CSP) for Type-I OPA and Type-I idler-SHG when pumping at 2.05 μm and amplifying 3.0 μm with the crystal orientation given by θ=44.8° as seen in FIG. 6. FIG. 6 shows example birefringent phase matching curves. At 610, $\Delta k_{OPA}$ is plotted for 2.05 μm pumped OPA vs. signal wavelength for OPA pumped at 2.05 μm in CSP with a phase matching angle of θ=44.8°. At 620, $\Delta k_{SHG}$ for the idler of the same OPA process is plotted vs. the corresponding signal wavelength in CSP with a phase matching angle of θ=44.8°. Simultaneous phase matching of both processes occurs near signal wavelengths of 3 μm. An amplifier with these characteristics will satisfy the requirements of BCS-OPA, producing an amplified signal at 3.0 μm with suppressed back-conversion and simultaneous conversion of the corresponding idler at 6.5 μm to its second harmonic at 3.25 μm.

FIGS. 7A-7F show example results for high-gain amplification of a 2-ps, 1-nJ, 1-mm radius, signal wave in a 2.3-mm CSP crystal, pumped by a 5-mJ, 2.05-μm wavelength pump of the same duration and radius. FIG. 7A illustrates the evolution of energy exchange between waves at the center of the pulse in time and space, which displays the desired asymptotic approach to full pump depletion, during which back conversion is suppressed. Back-conversion remains suppressed for over a millimeter, allowing depletion of the spatiotemporal wings of the pump to catch up before any significant back-conversion occurs at the center (FIG. 7B). The suppression of signal back-conversion across the full spatiotemporal coordinate space allows more than 80% pump depletion (FIG. 7F). Only 12% pump depletion is predicted for conventional OPA (FIG. 7E). Accounting for the quantum defect, in BCS-OPA, 55% energy conversion efficiency to the signal is predicted with >106 gain in a single stage (see spectrum, FIG. 7C). The remaining 45% of the energy is split between the idler at (3%) the idler-SH at (23%), and the unconverted pump (19%). In contrast, in conventional OPA, the energy conversion efficiency to the signal is maximized at 8%. We note that the crystal length is well shorter than the spatial walk-off length, temporal walk-off length, and diffraction length for these conditions, which helps enable successful conversion.

Quasi-Phase Matching in Lithium Niobate (LNB)

Designing a single QPM structure capable of simultaneously phase matching two or more nonlinear optical processes is a complicated problem with a large solution space.

Especially important for QPM structures that perform BCS-OPA is the ability to balance the phase mismatch of two nonlinear processes so that the dynamics of one process does not overpower the other. A multi-phase matching QPM structure can be obtained via numerical optimizing; however, manufacturing constraints on minimum domain size, resolution, and variability often render such techniques impractical. One practical method of designing multi-phase matching QPM structures uses an aperiodic tiling of the single process QPM domains associated with each process involved. We find that such a structure is inadequate for high performance BCS-OPA since only a single process is perfectly phase matched at a time while the other process is severely phase mismatched.

Disclosed is an implementation using QPM structures that solves the above issues for BCS-OPA. This technique involves a superlattice of domain reversals that simultaneously account for the phase mismatch of each process. The design of this superlattice QPM structure is simple. Consider the two processes involved in BCS-OPA that have phase mismatch $\Delta k_1$ and $\Delta k_2$. From these we may calculate two periodic poling frequencies, $G_+$ and $G_-$, that form the basis of the superlattice structure:

$$\begin{bmatrix} G_+ \\ G_- \end{bmatrix} = \begin{bmatrix} \frac{1}{2} & \frac{1}{2} \\ \frac{1}{2} & -\frac{1}{2} \end{bmatrix} \begin{bmatrix} \Delta k_1 \\ \Delta k_2 \end{bmatrix} \qquad \text{EQ. (13)}$$

where $G_+$ generates a poling period that serves to equalize the magnitude of the phase mismatch for either process and $G_-$ generates a poling period that cancels this new phase mismatch. The superlattice is constructed by first creating domain reversals with periodicity $$\Lambda_+ = \frac{2\pi}{G_+},$$

then by superimposing domain reversals with periodicity $$\Lambda_- = \frac{2\pi}{G_-}.$$

Figure 8:
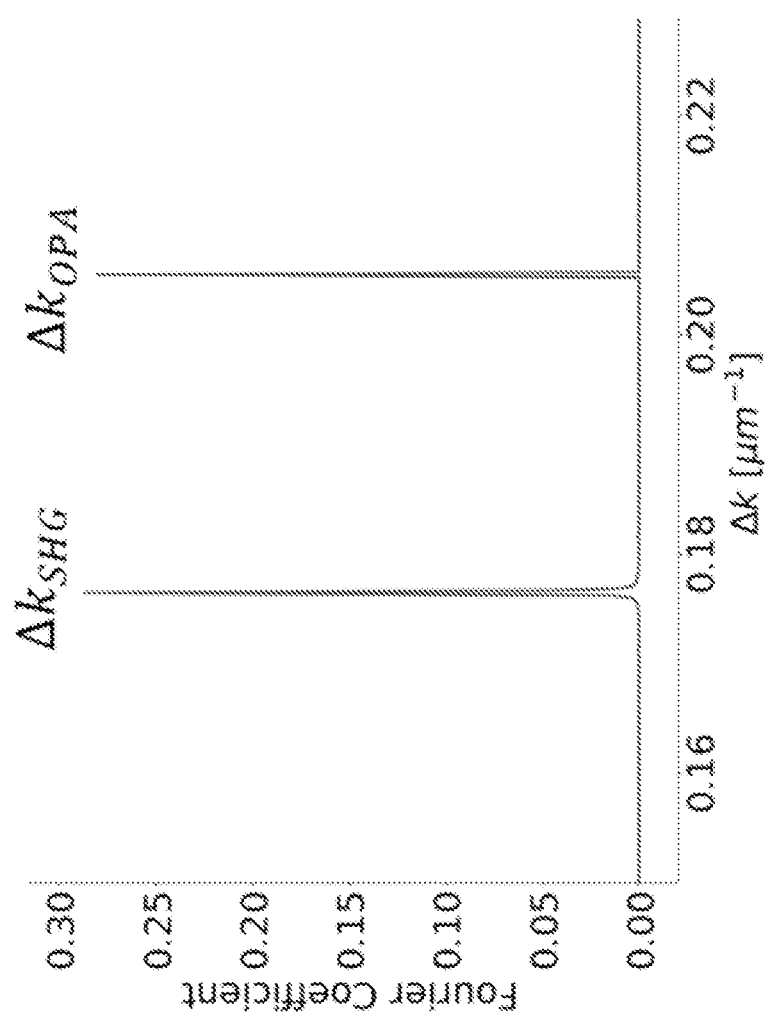
FIG. 8 shows an example of the Fourier transform of a rounded superlattice quasi-phase-matching (QPM) structure revealing sharp Bragg peaks at the desired values of $\Delta k$ corresponding to the constituent processes of BCS-OPA.

Finally, each domain wall of the $\max(\Lambda_+, \Lambda_-)$ periodic lattice is rounded to the nearest domain wall of the $\min(\Lambda_+, \Lambda_-)$ periodic lattice. This final step ensures manufacturability by creating a QPM structure that only has one domain size of width $\min(\Lambda_+, \Lambda_-)/2$, where there are occasionally repeated positive or negative domains. FIG. 8 shows the 1D spatial Fourier transform of the superlattice QPM domain poling function with domain periods $\Lambda_+$=32.9 µm and $\Lambda_-$=434.8 µm designed for BCS-OPA with a 1030-nm pump and 1670-nm signal in Mg:LiNbO3. This amounts to an implementation using the "rounded superlattice" type of QPM.

The rounded supper lattice QPM device described in this patent document can be used to implement the simultaneous phase matching of any two nonlinear wave-mixing processes.

Demonstrated is simultaneous phase matching of OPA and idler-SHG using the novel QPM structure outlined above. We modeled a high gain amplification poled LNB stage (60 dB gain) in an OPCPA configuration with a 4 ps, 500 µJ, 30 GW/cm2 Gaussian pump and a chirped 4.4 ps, 100 pJ, 40 nm FWHM seed at 1.65 µm. The Lithium Niobate crystal can be designed to include spatially alternating domains or regions where two adjacent domains have opposite crystal orientations or are inverted (poled) relative to one another. The inverted portions of the crystal yield generated photons that are 180° out of phase with the generated photon that would have been created at that point in the crystal if it had not been poled. By choosing the correct periodicity with which to flip the orientation of the crystal, the newly generated photons will always (at least partially) interfere constructively with previously generated photons, and as a result, the number of generated photons will grow as the light propagates through the poled material, yielding a high conversion efficiency of input to generated photons.

FIGS. 9A and 9B show clear back-conversion suppression characteristic of BCS-OPA. Choosing the optimal length of 6.8 mm, homogenous depletion of the pump in space and time is observed (FIG. 9F), resulting in 65% pump energy depletion with 40% going to the signal with a 140 fs FWHM transform limited pulse duration and 15% going to a 1.37 µm, 140 fs second harmonic of the idler (see spectrum, FIG. 9C). We compare this to an OPA without back-conversion suppression using a standard quasi-phase-matching (QPM) structure optimized for conventional OPA. FIG. 9E illustrates the efficiency limitation of conventional OPA due to the local dependence of conversion-back-conversion cycle period on the pump pulse's spatiotemporal profile. This results in inhomogeneous pump depletion with total depletion maximized at merely 14% when back conversion sets in, with only 8.7% of the energy going to the signal—a more than 4-fold decrease.

Quasi Phase Matching (QPM) by Tiling

Figure 10:
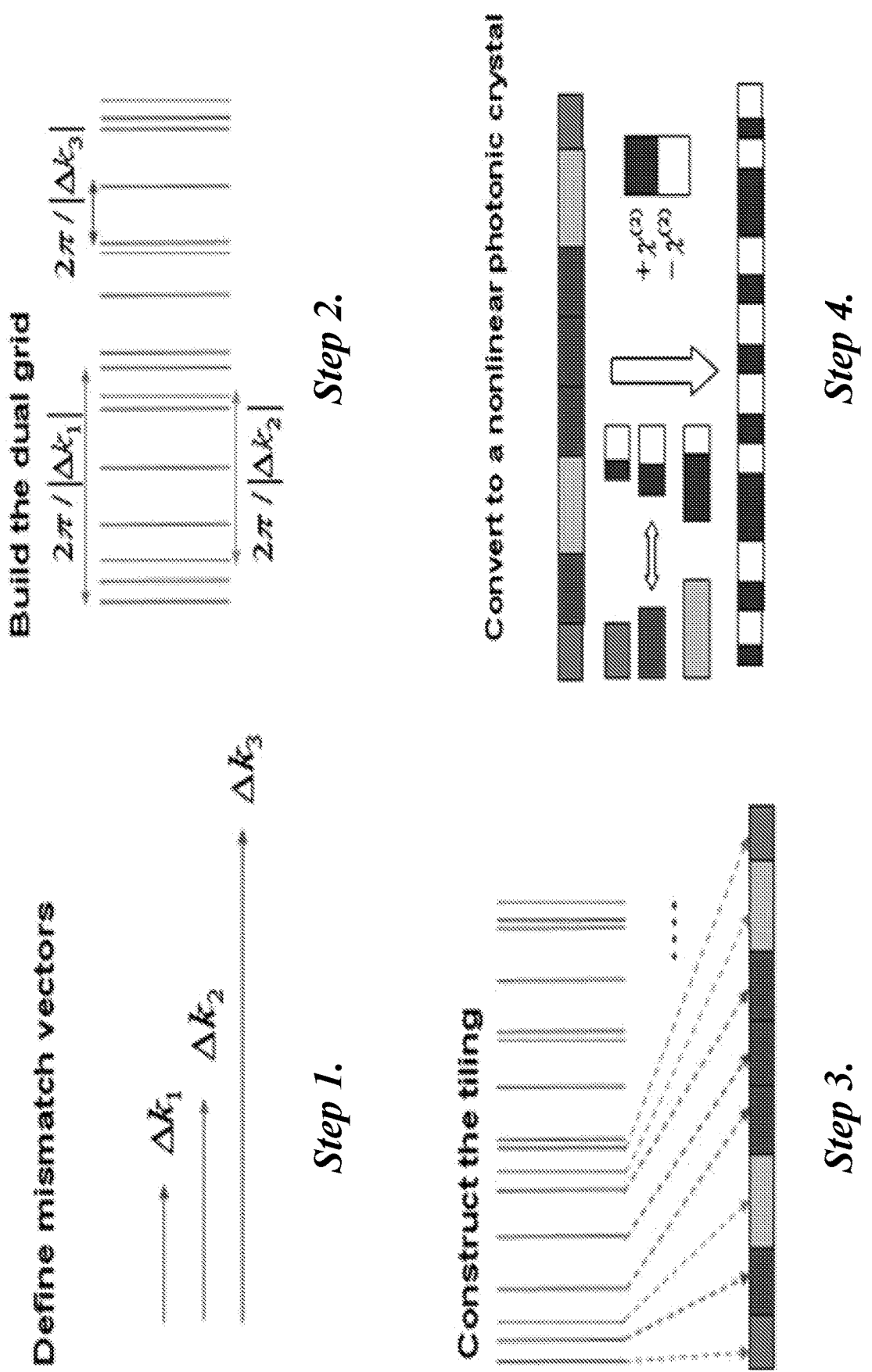
FIG. 10 shows example steps for using tiling to create a crystal grating from wavevector mismatches for alternately quasi-phase matching two or more processes.

Simultaneous phase matching of multiple processes has been shown using the tiling method. The tiling method works by stacking QPM periods one after the other in a particular order. The order is determined by constructing a tiling based on the wavevector mismatches of each nonlinear process. FIG. 10 depicts an example graphic for crystal design. See Alon Bahabad, Noa Voloch, Ady Arie, and Ron Lifshitz, "Experimental confirmation of the general solution to the multiple-phase-matching problem," J. Opt. Soc. Am. B 24, 1916-1921 (2007).

Figure 11B:
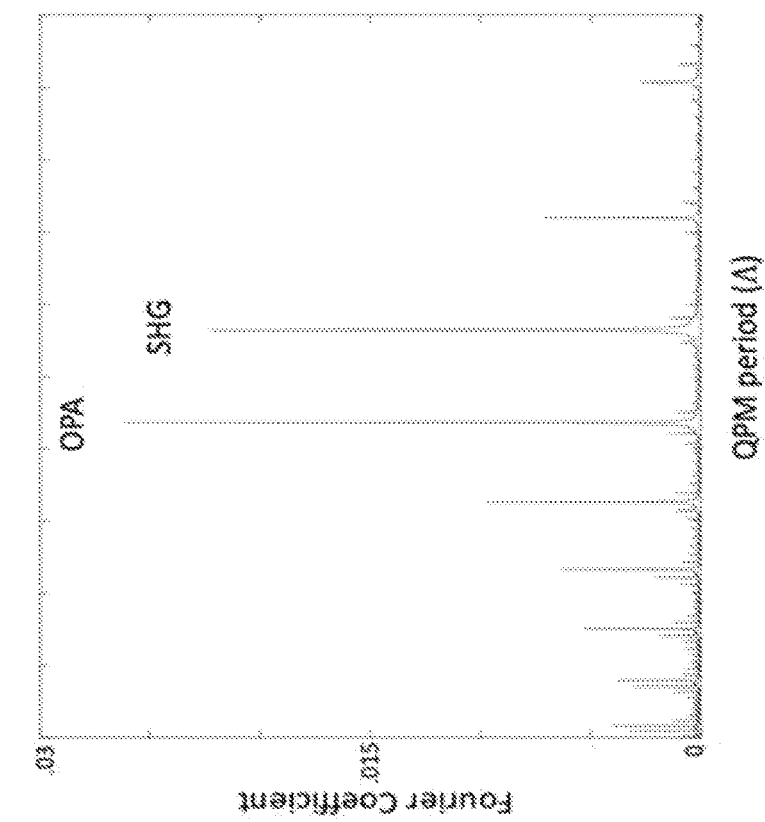
FIG. 11B shows an example of a grating spectrum for the tiling method.
Figure 11A:
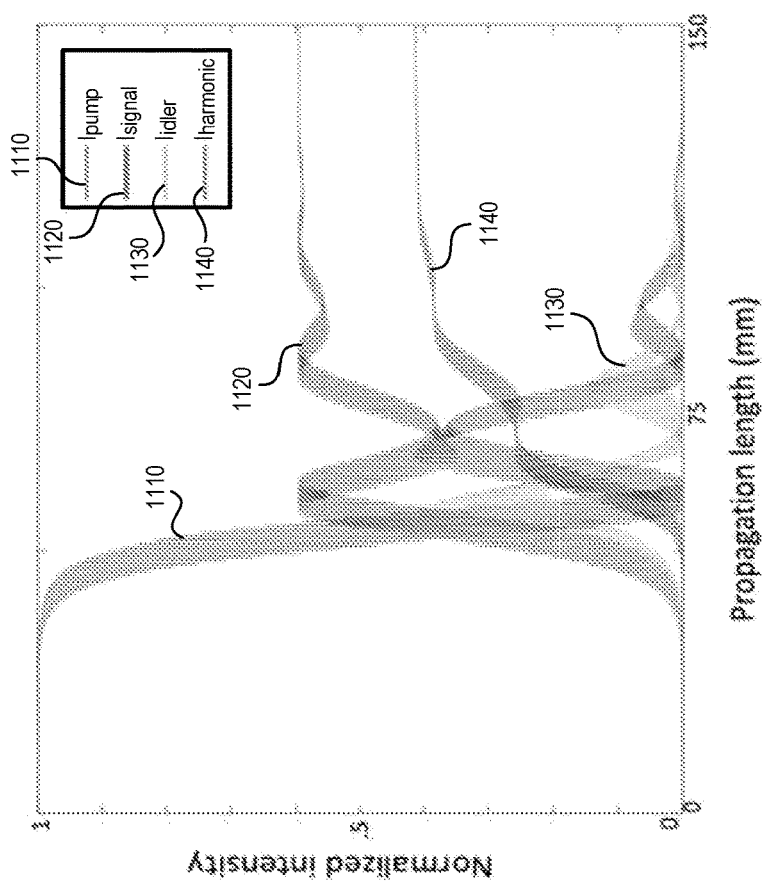
FIG. 11A shows an example of normalized intensity as a function of propagation length for various intensity parameters for the tiling method.

These steps may be followed to design a crystal grating for SHA. The results are shown in FIGS. 11A and 11B. Note that in FIG. 11B, the Bragg peaks in the Fourier transform are more than an order of magnitude lower than in the case of a single QPM period designed for OPA, shown in FIG. 13. The intensity plot shows the same form as the theoretical plot; however, the weak peaks in the grating spectrum translate to an unfeasible conversion length—the typcal manufacturing range for QPM crystals is around 2-3 cm. Shown in FIG. 11A at 1110 is an example pump intensity, at 1120 signal intensity, at 1130 idler intensity, and at 1140 idler second harmonic intensity. Beyond the impractical conversion length, there are also undesirable fast conversion-backconversion cycles, and the long length may lead to temporal walkoff between pulses due to mismatched group velocities.

Windowed Quasi Phase Matching (QPM)

The disclosed subject matter involves a "windowing" method for simultaneous QPM of two wave-mixing processes. The weak Bragg peaks and fast oscillations from FIG. 11B may be caused by the way QPM periods are being stacked. This suggests that designs should instead overlay two periods and "view" each underlying period with some outer periodic structure. The window period may be defined to be $\Lambda_{Window}=\Lambda_{OPA}+\Lambda_{SHG}$. The outer window function may be defined to be $W(z)=\text{sign}(\cos(2\pi z/\Lambda_{Window}))$. A final piecewise crystal grating function may be defined as:

$$W(z)=1: d(z)=d_{eff}\text{sign}(\cos(2\pi z/\Lambda_{OPA}))$$

$$W(z)=-1: d(z)=d_{eff}\text{sign}(\cos(2\pi z/\Lambda_{SHG})). \quad \text{EQ (14)}$$

Figure 12:
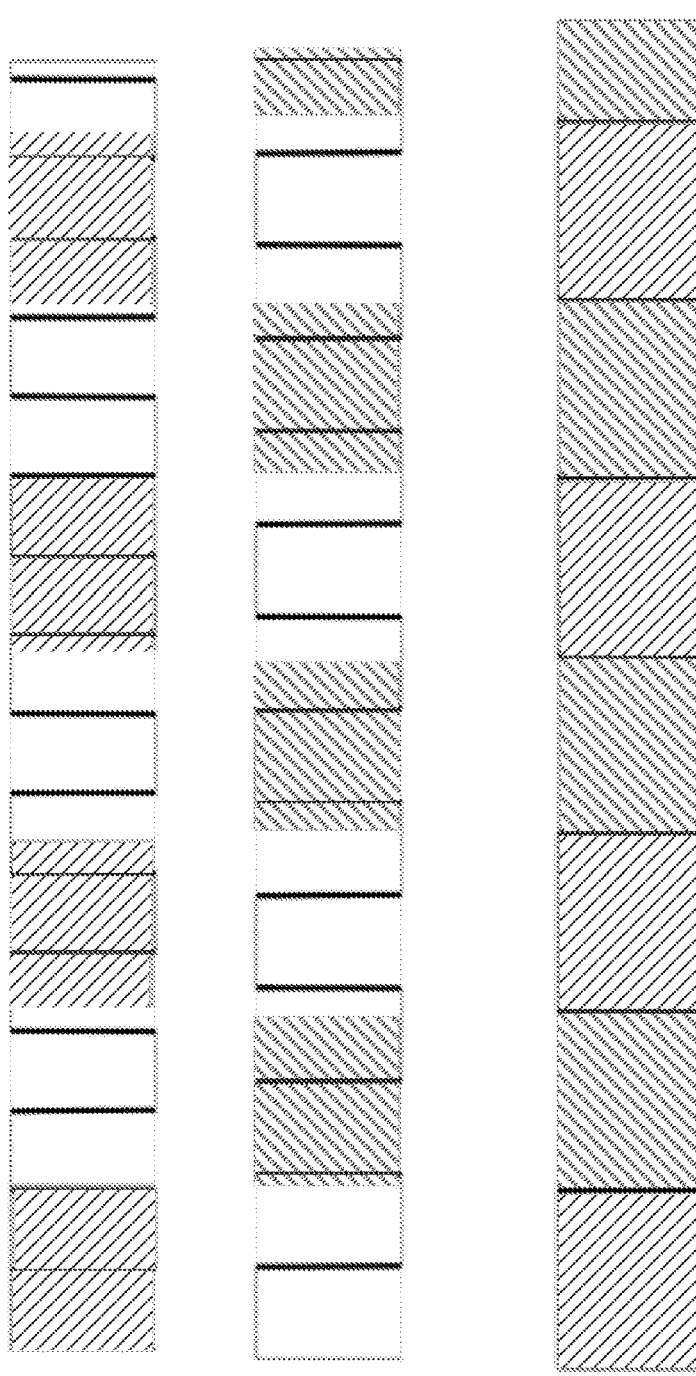
FIG. 12 shows an example of a visualization of the windowing QPM method.

A visualization of the windowing principle is shown at FIG. 12.

Figure 13:
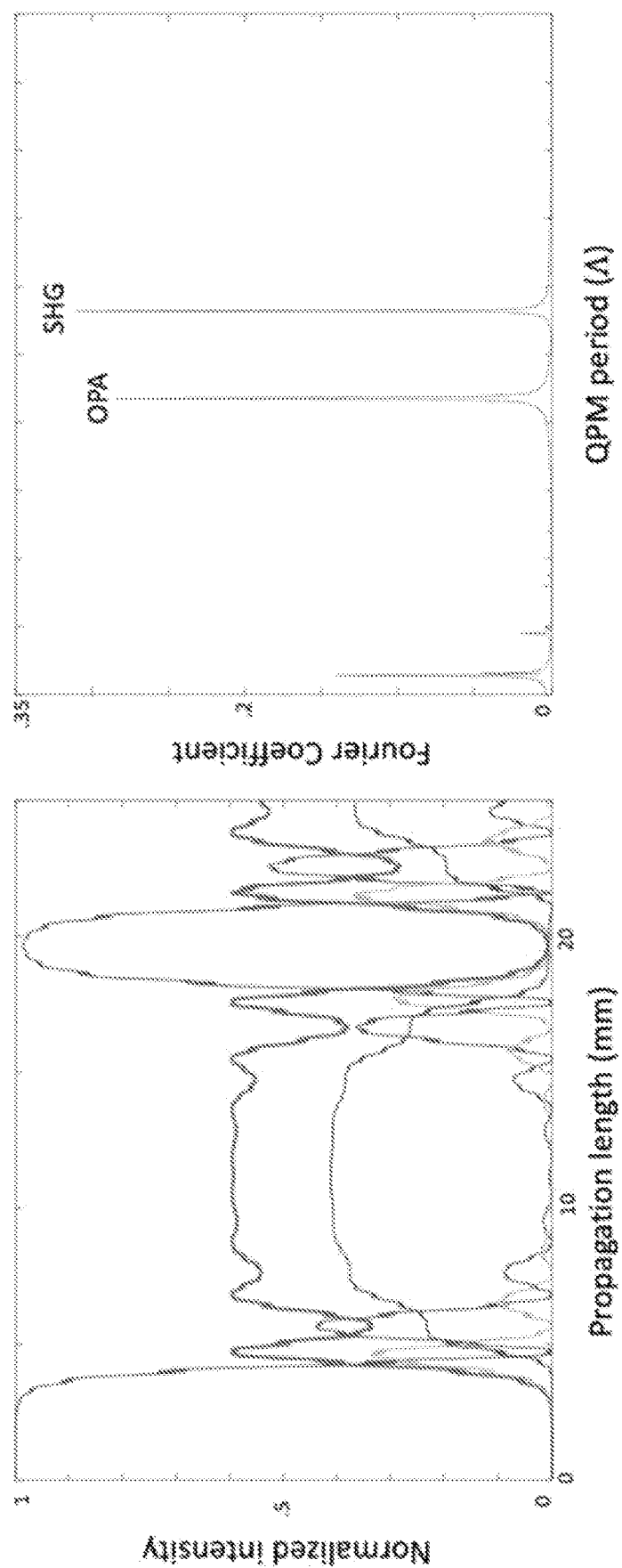
FIG. 13 shows examples of an intensity plot and grating spectrum for the windowing method with a 50% duty cycle.

Shown at FIG. 13 is a simulation of the conversion of this design. The Fourier coefficients for this design are an order of magnitude higher than those in the tiling case. This leads to the conversion occurring on the millimeter scale instead of the centimeter scale. Similar conversion dynamics are observed as in the case of perfect phase matching, plotted in FIG. 14. Unlike the theoretical case however, the windowing method may temporarily suppress back conversion to the pump. This may be a hurdle to achieving arbitrarily good efficiency as was observed using the theoretical model.

Figure 14:
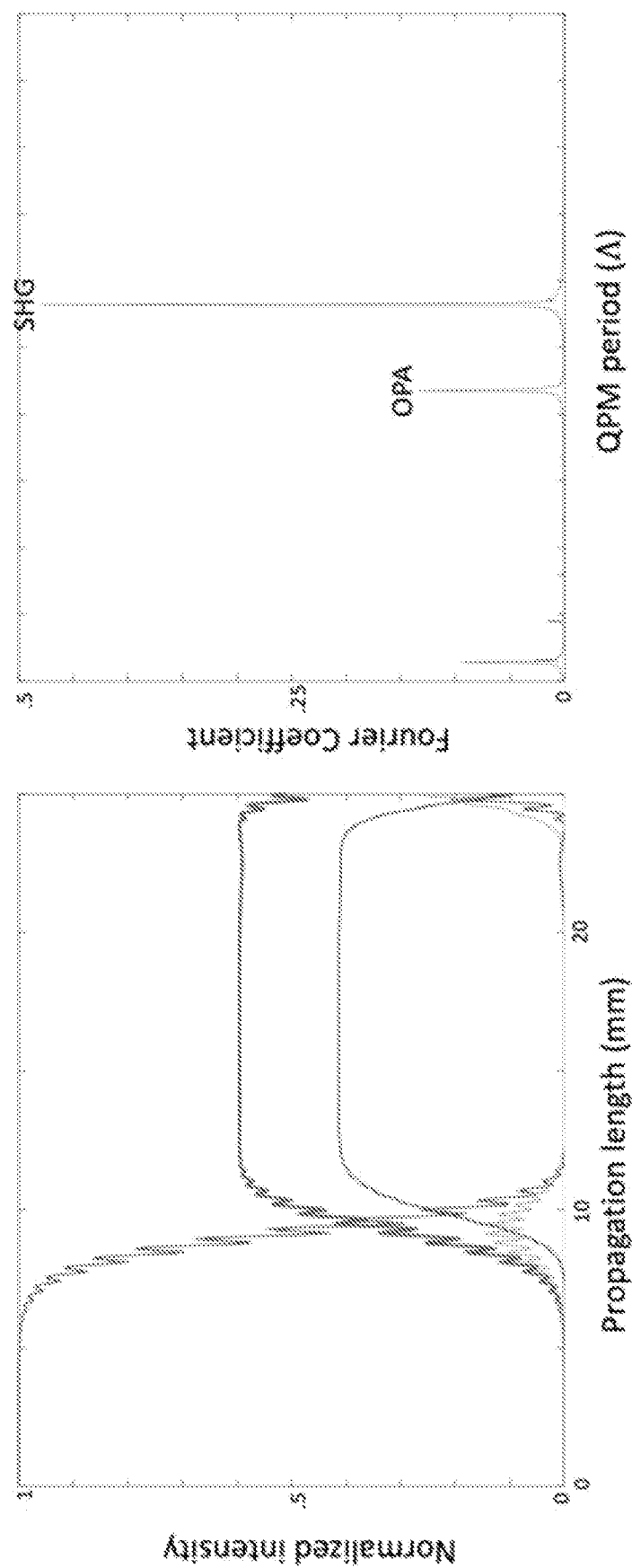
FIG. 14 shows examples of an intensity plot and grating spectrum for the windowing method with a 23.42% duty cycle.

To optimize the efficiency of the second harmonic amplifier, it is desirable to eliminate the initial dip in the signal profile. The initial dip is caused by the presence of the idler field at the point where the pump has fully depleted. Therefore, it is desirable to favor the SHG process over the OPA, so that when the pump field is depleted all of the generated idler has simultaneously converted to its harmonic wave. To achieve this, the duty cycle of the outer period window function, W(z), is altered. In FIG. 14, the simulated conversion dynamics is shown for a 23.42% duty cycle in W(z). The 23.42% duty cycle was determined after careful optimization of the parameter space. Other optimum duty cycles may be determined for other devices. In some example embodiments, a 1:3 ratio of OPA to SHG best achieves the desired results.

The crystal grating spectrum in FIG. 14 shows that by changing the duty cycle, the strength of the Fourier coefficients can be adjusted. The initial dip in the signal conversion has also been eliminated. The ability to easily customize the Fourier spectrum represents another advantage of the disclosed windowing method that could be beneficial outside the context of SHA.

Figure 15:
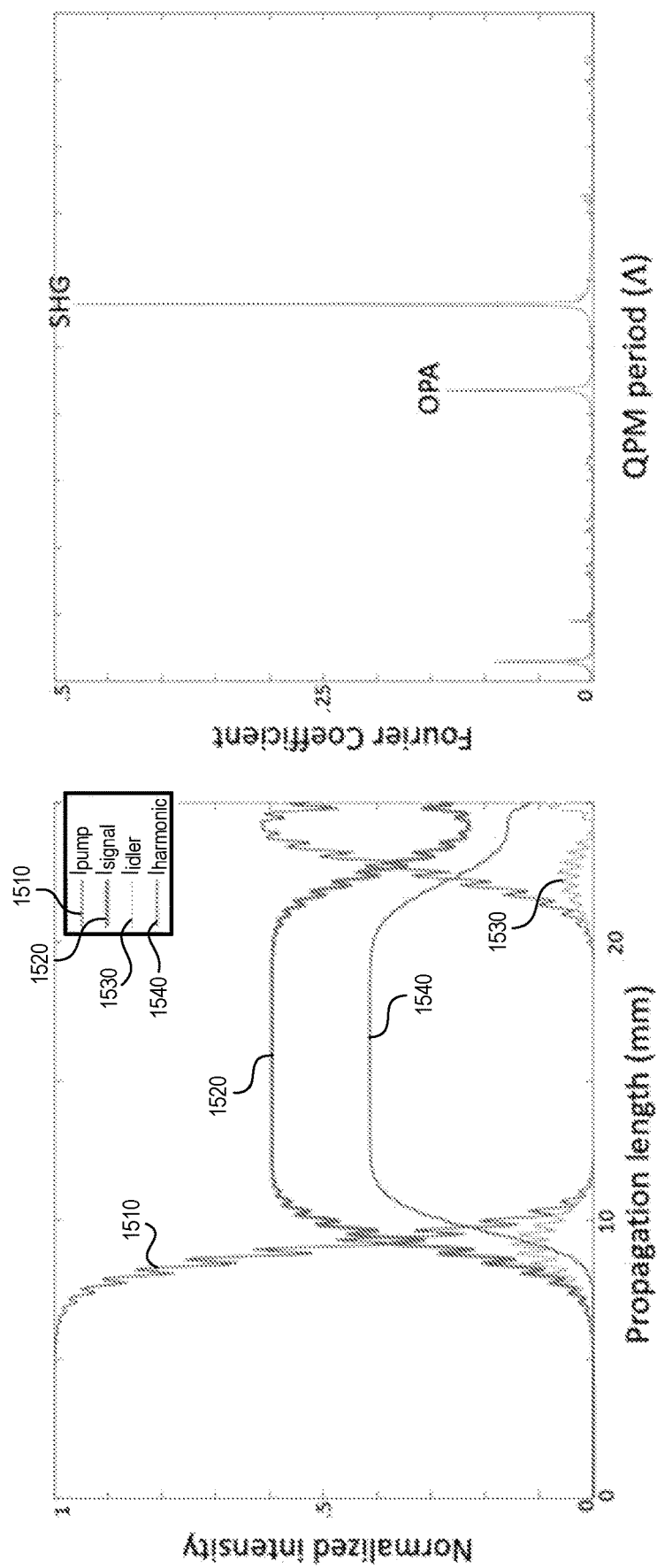
FIG. 15 shows examples of an intensity plot and grating spectrum for windowing method with 23.42% duty cycle and domain flips less than 4 μm eliminated.

In addition to the length limitation in the manufacturing of QPM crystals, there is also a minimum domain size—typically around 2 microns. Due to the way the windowing method switches between viewing overlaid square waves, the crystals used in FIGS. 13 and 14 contain domains below this 2-micron threshold. To address this issue, the window boundaries can be tailored to eliminate domains under 4 microns. In the Fourier analysis, shown in FIG. 15, a 3% decrease in the height of the OPA Bragg peak is observed. There is also a slight drop off in the suppression of the back-conversion, which now occurs earlier in the crystal. The conversion length, however, is within 2.5 cm and still achieves good suppression of back-conversion.

Figure 16:
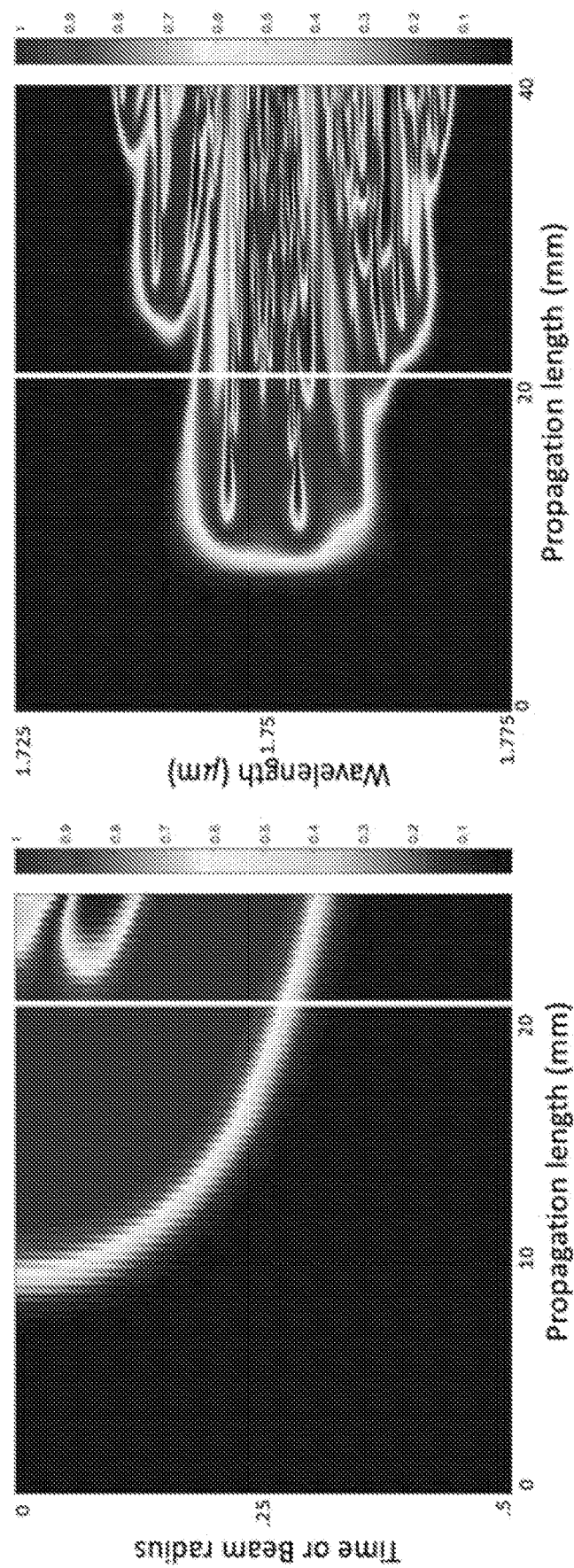
FIG. 16 shows examples of intensity and wavelength scans for windowing method with 23.42% duty cycle and small domain flips eliminated.

Shown in FIG. 16 are example results of intensity and wavelength scans for a windowed crystal with small domains removed. With this method, a large increase is predicted in the efficiency of the pump energy converted and up to 40 nm of bandwidth. By integrating the conversion efficiency and pump pulse profile, the percent of the pump energy converted to the signal and harmonic fields can be calculated. If a Gaussian distribution is assumed for the input pump and signal pulses in both time and space, the total efficiency increases from 5% for OPA to 73% for SHA in terms of pump energy converted. This represents an order of magnitude increase in efficiency and offers a promising route to improving the overall efficiency of nonlinear amplifiers.

Figure 17:
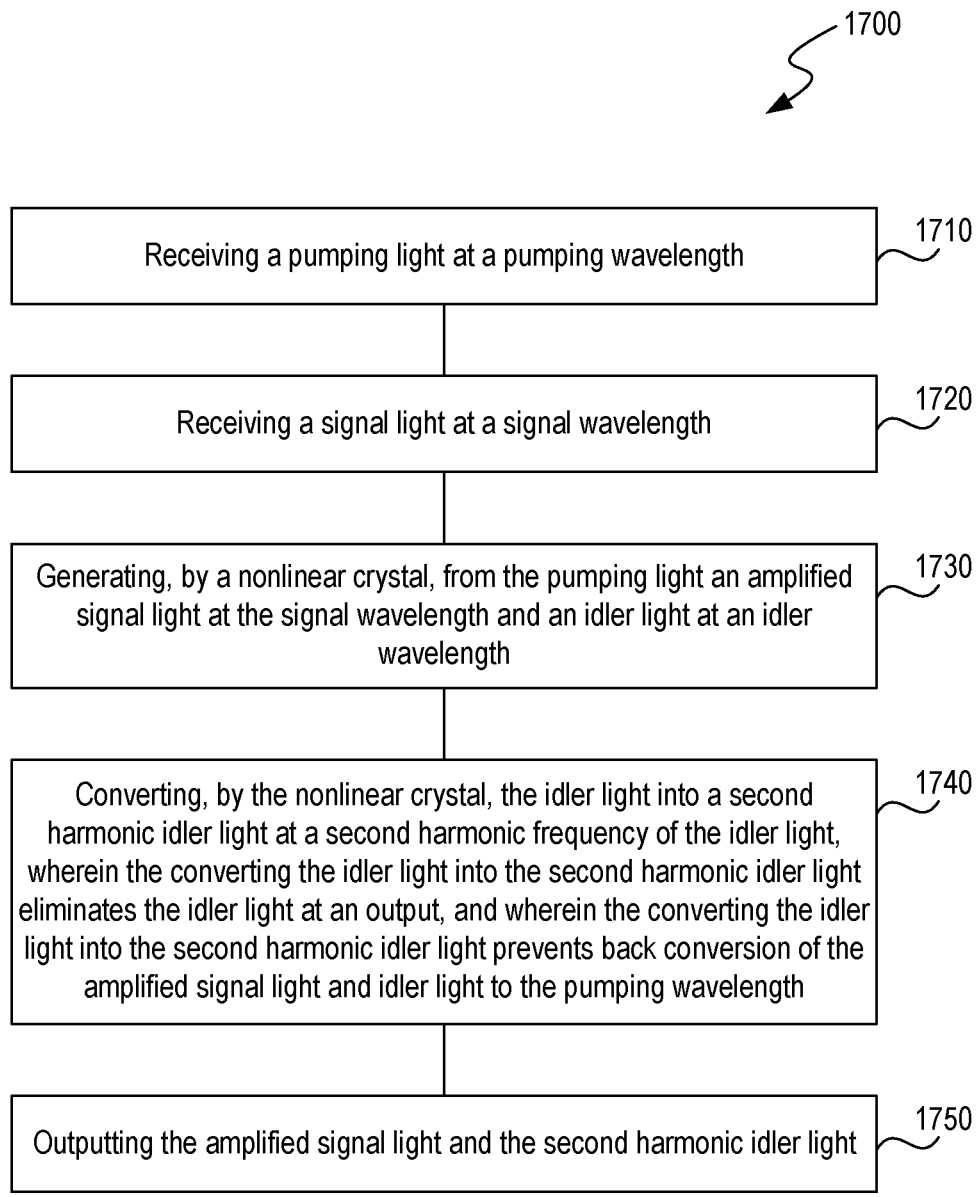
FIG. 17 shows an example of a process for BCS-OPA.

FIG. 17 depicts a process 1700, in accordance with some example embodiments. At 1710, the process includes receiving a pumping light at a pumping wavelength. At 1720, the process incudes receiving a signal light at a signal wavelength. At 1730, the process includes generating, by a nonlinear crystal, from the pumping light an amplified signal light at the signal wavelength and an idler light at an idler wavelength. At 1740, the process includes converting, by the nonlinear crystal, the idler light into a second harmonic idler light at a second harmonic frequency of the idler light. The converting the idler light into the second harmonic idler light eliminates the idler light at an output. The converting the idler light into the second harmonic idler light prevents back conversion of the amplified signal light and idler light to the pumping wavelength. The sequence of process 1730 followed by process 1740 is ensured by achieving the condition of simultaneous phase matching of each of these processes within the nonlinear optical material. At 1750, the process includes outputting the amplified signal light and the second harmonic idler light.

BCS-OPA has been demonstrated for back-conversion suppression of the pump in an ultrafast OPA process that allows nearly full spatiotemporal conversion of the pump to a signal and secondary field by simply introducing a simultaneously phase-matched SHG process that nonlinearly attenuates the idler. The versatility of this process has been demonstrated by achieving highly efficient BCS-OPA using birefringent phase matching in CSP and novel quasi-phase-matching (QPM) structures in LiNbO$_3$. BCS-OPA will likely play a vital role in improving the energy efficiency and tunability of future laser systems. It is noted that application of the SHG process to the signal pulse rather than the idler also worked well in our simulations, allowing efficient conversion to an SH field with a frequency greater than the pump.

Figure 18:
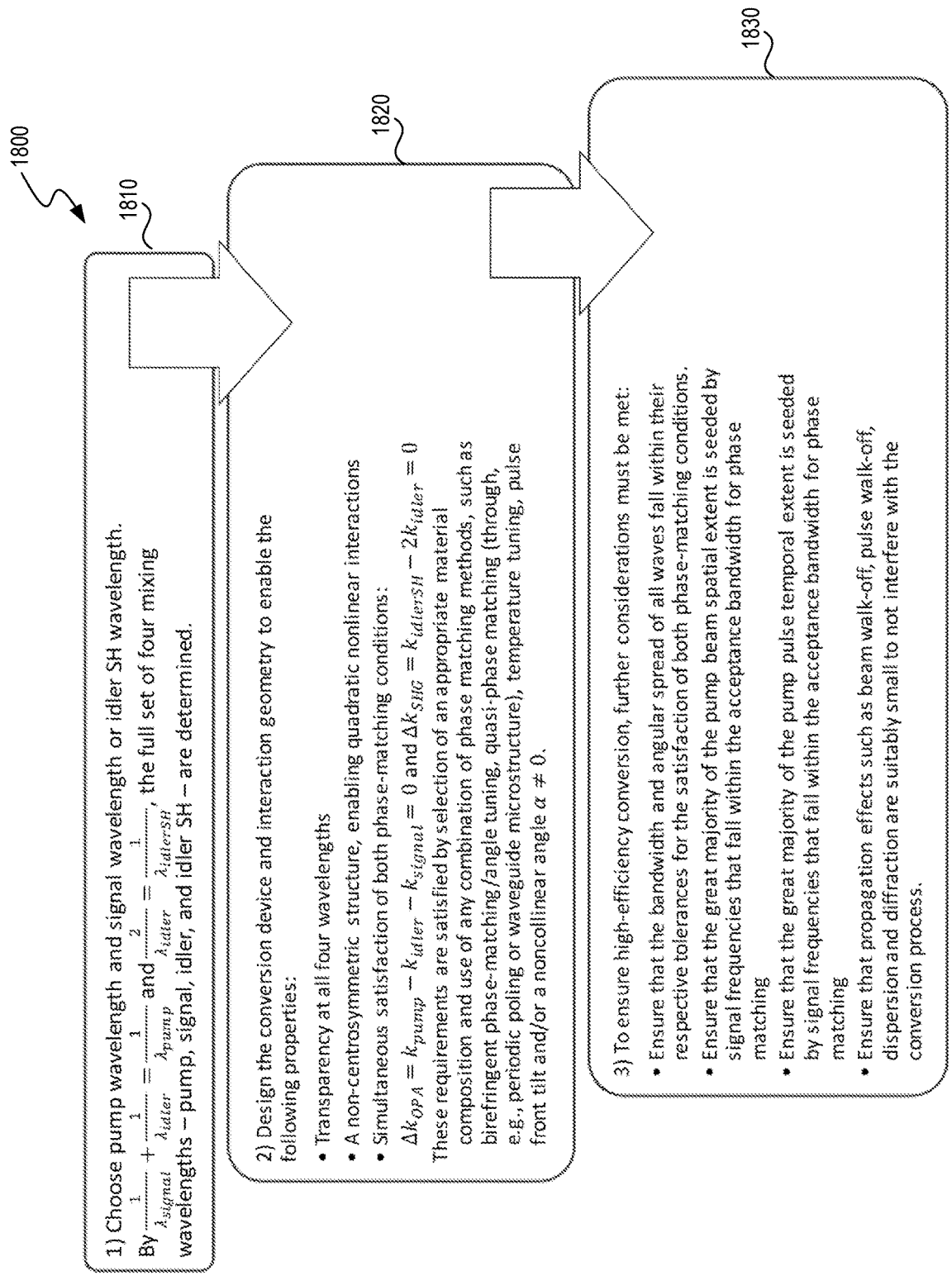
FIG. 18 shows another example of a process for BCS-OPA.

FIG. 18 shows an example of a process 1800 for designing a BCS-OPA device. At 1810, the process includes choosing a pump wavelength and signal wavelength or idler second harmonic wavelength. Using the equations $$\frac{1}{\lambda_{signal}}+\frac{1}{\lambda_{idler}}=\frac{1}{\lambda_{pump}} \text{ and } \frac{2}{\lambda_{idler}}=\frac{1}{\lambda_{idlerSH}},$$

the full set of four mixing wavelengths—pump, signal, idler, and idler SH—are determined. At 1820, the device and interaction geometry are selected to cause: 1) Transparency at all four wavelengths; 2) A non-centrosymmetric structure, enabling quadratic nonlinear interactions; 3) Simultaneous satisfaction of both phase-matching conditions: $\Delta k_{OPA}=k_{pump}-k_{idler}-k_{signal}=0$ and $\Delta k_{SHG}=k_{idlerSH}-2k_{idler}=0$. These requirements are satisfied by selecting an appropriate material composition and use of phase matching methods, such as birefringent phase-matching/angle tuning, quasi-phase matching (through, e.g., periodic poling or waveguide microstructure), temperature tuning, pulse front tilt and/or a noncollinear angle $\alpha\neq 0$. At 1830, to ensure high-efficiency conversion, one or more further considerations should be satisfied including: 1) Ensuring that the bandwidth and angular spread of all waves fall within their respective tolerances for the satisfaction of both phase-matching conditions; 2) Ensuring that most or all the pump beam spatial extent is seeded by signal frequencies that fall within the acceptance bandwidth for phase matching; 3) Ensuring that most or all the pump pulse temporal extent is seeded by signal frequencies that fall within the acceptance bandwidth for phase matching; 4) Ensuring that propagation effects such as beam walk-off, pulse walk-off, dispersion and diffraction are suitably small to not interfere with the conversion process.

Described above are techniques and an example device for second harmonic amplification which is a technique for depleting the unwanted idler wave as it is converted, which suppresses the back-conversion cycle and greatly increases the efficiency of nonlinear amplifiers. Disclosed are techniques for simultaneous phase matching of multiple nonlinear processes in a single crystal. By conducting a Fourier analysis of a quasi-phase matched design and comparing it to previous techniques, the disclosed windowing method achieves better phase matching and may have applications outside second harmonic amplification. An example quasi-phase matched crystal using lithium niobate is within current fabrication limits and is customizable to several different wavelength regimes.

Disclosed is a windowing method for phase matching; however, other possible phase matching techniques such as "rounded superlattice" quasi-phase matching and birefringent phase matching in bulk crystals also offer a platform for SHA. Disclosed is an example showing two interacting nonlinear processes, OPA and SHG, but the disclosed technique may be applied to three interacting processes to build even more efficient amplifiers.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed is:

1. An optical parametric amplifier apparatus, the apparatus comprising:
   one or more input ports structured to receive pumping light at a pumping wavelength and receive signal light at a signal wavelength;
   one or more output ports structured to output light including an amplified signal light at the signal wavelength and a second harmonic idler light with a frequency that is a second harmonic frequency of an idler light; and
   a nonlinear optical material positioned relative to the one or more input ports and the one or more output ports to receive and to mix the pumping light and the signal light and structured to cause nonlinear conversion of the pumping light into the amplified signal light at the signal wavelength and generate the idler light at an idler wavelength, wherein the nonlinear optical material is further structured to cause nonlinear conversion of the idler light into the second harmonic idler light at the second harmonic frequency of the idler light, and wherein the generated second harmonic idler light eliminates the idler light at the one or more output ports and prevents back-conversion of the amplified signal light and idler light to the pumping wavelength.

2. The optical parametric amplifier apparatus of claim 1, wherein the nonlinear optical material provides simultaneous phase matching for the nonlinear conversion of the pumping light into the amplified signal and the nonlinear conversion of the idler light into the second harmonic of the idler light.

3. The optical parametric amplifier apparatus of claim 2, wherein the nonlinear optical material is a bulk crystal having a birefringent phase matching structure.

4. The optical parametric amplifier apparatus of claim 3, wherein the simultaneous phase matching results from one or more of angle tuning, temperature tuning, noncollinearity of the signal light and the pump light, or pulse-front tilting of the signal light and/or the pump light.

5. The optical parametric amplifier apparatus of claim 3, wherein the nonlinear optical material comprises a selected material and a selected orientation to cause the simultaneous phase matching.

6. The optical parametric amplifier apparatus of claim 3, wherein the nonlinear optical material is cadmium silicon phosphide.

7. The optical parametric amplifier apparatus of claim 1, wherein the nonlinear optical material is a quasi-phase matching (QPM) structure which includes one or more of a periodically poled structure, a superlattice structure including a rounded superlattice QPM structure, a windowed QPM structure, a tiling QPM structure, a chirped poling structure, a waveguide with a longitudinally modulated dimension, or a graded-index waveguide.

8. The optical parametric amplifier apparatus of claim 1, wherein the nonlinear optical material is a quasi-phase matching (QPM) structure which is tuned in phase by one or more of tuning of an optical axis relative to the input beams, tuning a temperature, noncollinearity of signal and pump, and pulse-front tilting of signal and/or pump pulse.

9. The optical parametric amplifier apparatus of claim 1, wherein the nonlinear optical material is a quasi-phase matching (QPM) structure which includes poled lithium niobate materials.

10. A method of optical parametric amplification, the method comprising:
    receiving a pumping light at a pumping wavelength;
    receiving a signal light at a signal wavelength;

generating, by a nonlinear crystal, from the pumping light an amplified signal light at the signal wavelength and an idler light at an idler wavelength;

converting, by the nonlinear crystal, the idler light into a second harmonic idler light at a second harmonic frequency of the idler light, wherein the converting the idler light into the second harmonic idler light eliminates the idler light at an output, and wherein the converting the idler light into the second harmonic idler light prevents back conversion of the amplified signal light and idler light to the pumping wavelength;

simultaneously phase matching for optical parametric amplification and phase matching for converting the idler light into the second harmonic idler light and outputting the amplified signal light and the second harmonic idler light.

11. The method of optical parametric amplification of claim 10, wherein the nonlinear crystal is a bulk crystal structured for birefringent phase matching.

12. The method of optical parametric amplification of claim 11, wherein the simultaneous phase matching results from one or more of angle tuning, temperature tuning, noncollinearity of the signal light and the pump light, or pulse-front tilting of the signal light and/or the pump light.

13. The method of optical parametric amplification of claim 10, wherein the nonlinear crystal is a quasi-phase matching (QPM) structure.

14. The method of optical parametric amplification of claim 13, wherein the QPM structure includes one or more of a periodically poled structure, a superlattice structure including a rounded superlattice QPM structure, a windowed QPM structure, a tiling QPM structure, a chirped poling structure, a waveguide with a longitudinally modulated dimension, or a graded-index waveguide.

15. The method of optical parametric amplification of claim 13, wherein the QPM structure is combined with one or more of tuning of an optical axis relative to the input beams, tuning a temperature, noncollinearity of signal and pump, and pulse-front tilting of signal and/or pump pulse.

16. The method of optical parametric amplification of claim 13, wherein the quasi phase matching structure comprises poled lithium niobate.

17. The method of optical parametric amplification of claim 16, wherein the pumping wavelength is 1 micron, the pumping light is a picosecond laser pulse, the signal wavelength is 1.65 microns, the second harmonic idler light has a second harmonic idler wavelength of 1.37 microns, and the amplified signal light and the second harmonic idler light have a duration of less than 150 femtoseconds.

* * * * *